US010120129B2

(12) United States Patent
Usami

(10) Patent No.: US 10,120,129 B2
(45) Date of Patent: Nov. 6, 2018

(54) SEMICONDUCTOR DEVICE AND METHOD FOR MANUFACTURING SAME

(71) Applicant: Renesas Electronics Corporation, Koutou-ku, Tokyo (JP)

(72) Inventor: Tatsuya Usami, Ibaraki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/789,655

(22) Filed: Oct. 20, 2017

(65) Prior Publication Data

US 2018/0039021 A1 Feb. 8, 2018

Related U.S. Application Data

(63) Continuation of application No. 15/201,479, filed on Jul. 3, 2016, now Pat. No. 9,829,627.

(30) Foreign Application Priority Data

Aug. 10, 2015 (JP) ................. 2015-158187

(51) Int. Cl.
*G02B 6/10* (2006.01)
*G02B 6/122* (2006.01)
(Continued)

(52) U.S. Cl.
CPC ............ *G02B 6/122* (2013.01); *G02B 6/13* (2013.01); *G02F 1/025* (2013.01); *G02B 2006/12061* (2013.01); *G02F 2202/104* (2013.01)

(58) Field of Classification Search
CPC ................. G02B 6/122; G02B 6/13; G02B 2006/12061; G02F 1/025; G02F 2202/104
(Continued)

(56) References Cited

U.S. PATENT DOCUMENTS 7,704,862 B2    4/2010 Im et al.
7,935,584 B2    5/2011 Moriwaka et al.
(Continued)

OTHER PUBLICATIONS

Agarwal et al., "Low loss polycrystalline silicon waveguides for silicon photonics," *Journal of Applied Physics*, 1996, 80(11): pp. 6120-6123.
(Continued)

*Primary Examiner* — Thomas A Hollweg
*Assistant Examiner* — Guy Anderson
(74) *Attorney, Agent, or Firm* — Shapiro, Gabor and Rosenberger, PLLC

(57) ABSTRACT

Good optical properties can be achieved in an optical waveguide made of polycrystalline silicon.
A semiconductor layer that constitutes each of a first optical signal line, a second optical signal line, a grating coupler, an optical modulator, and a p-type layer of a germanium optical receiver is formed by a polycrystalline silicon film. Crystal grains of polycrystalline silicon exposed on an upper surface of the semiconductor layer include crystal grains having flat surfaces parallel to a first main surface of a semiconductor substrate, and crystal grains of polycrystalline silicon exposed on side surfaces (including side surfaces of a protrusion of a protruding portion) of the semiconductor layer include crystal grains having flat surfaces perpendicular to the first main surface of the semiconductor substrate.

19 Claims, 24 Drawing Sheets

(51) Int. Cl.
*G02B 6/13* (2006.01)
*G02F 1/025* (2006.01)
*G02B 6/12* (2006.01)

(58) Field of Classification Search
USPC .................................................. 385/129–132
See application file for complete search history.

(56) References Cited

U.S. PATENT DOCUMENTS

| | | | |
|---|---|---|---|
| 8,216,892 B2 | 7/2012 | Moriwaka et al. | |
| 8,791,405 B2 | 7/2014 | Ji et al. | |
| 8,873,895 B2 | 10/2014 | Fujikata et al. | |
| 2003/0213957 A1 | 11/2003 | Yamaguchi et al. | |
| 2003/0222380 A1* | 12/2003 | Katzir | G01N 21/552 264/667 |
| 2007/0085112 A1 | 4/2007 | Yamazaki et al. | |
| 2007/0087488 A1 | 4/2007 | Moriwaka | |
| 2007/0222038 A1 | 9/2007 | Moriwaka | |
| 2008/0171410 A1* | 7/2008 | Moriwaka | H01L 21/02422 438/166 |
| 2008/0213984 A1 | 9/2008 | Moriwaka | |
| 2008/0318398 A1 | 12/2008 | Moriwaka et al. | |
| 2010/0207253 A1 | 8/2010 | Moriwaka | |
| 2011/0042646 A1 | 2/2011 | Ohta et al. | |
| 2011/0097834 A1 | 4/2011 | Yamazaki et al. | |
| 2011/0133063 A1 | 6/2011 | Ji et al. | |
| 2011/0201183 A1 | 8/2011 | Moriwaka et al. | |
| 2011/0275285 A1 | 11/2011 | Satou et al. | |
| 2012/0200546 A1* | 8/2012 | Miyamoto | H01L 27/14623 345/205 |
| 2012/0240843 A1* | 9/2012 | Machuca | C30B 13/24 117/39 |
| 2012/0270400 A1 | 10/2012 | Takegoshi et al. | |
| 2013/0064491 A1 | 3/2013 | Fujikata et al. | |
| 2015/0049978 A1* | 2/2015 | Fujikata | G02F 1/025 385/3 |
| 2015/0125111 A1* | 5/2015 | Orcutt | G02B 6/122 385/14 |
| 2017/0031095 A1* | 2/2017 | Nakashiba | G02B 6/122 |
| 2017/0045683 A1 | 2/2017 | Usami | |

OTHER PUBLICATIONS

Kwong et al., "Ultralow-loss polycrystalline silicon waveguides and high uniformity 1×12 MMI fanout for 3D photonic integration," *Optics Express*, Sep. 2012, 20(19): pp. 21722-21728.

Liao et al., "Optical transmission losses in polycrystalline silicon strip waveguides: Effects of waveguide dimensions, thermal treatment, hydrogen passivation, and wavelength," *Journal of Electronic Materials*, 2000, 29(12): pp. 1380-1386.

Zhu et al., "CMOS-compatible deposited materials for photonic layers integrated above electronic integrated circuit," *International Scholarly and Scientific Research and Innovation*, 2013, 7(9): pp. 716-719.

\* cited by examiner

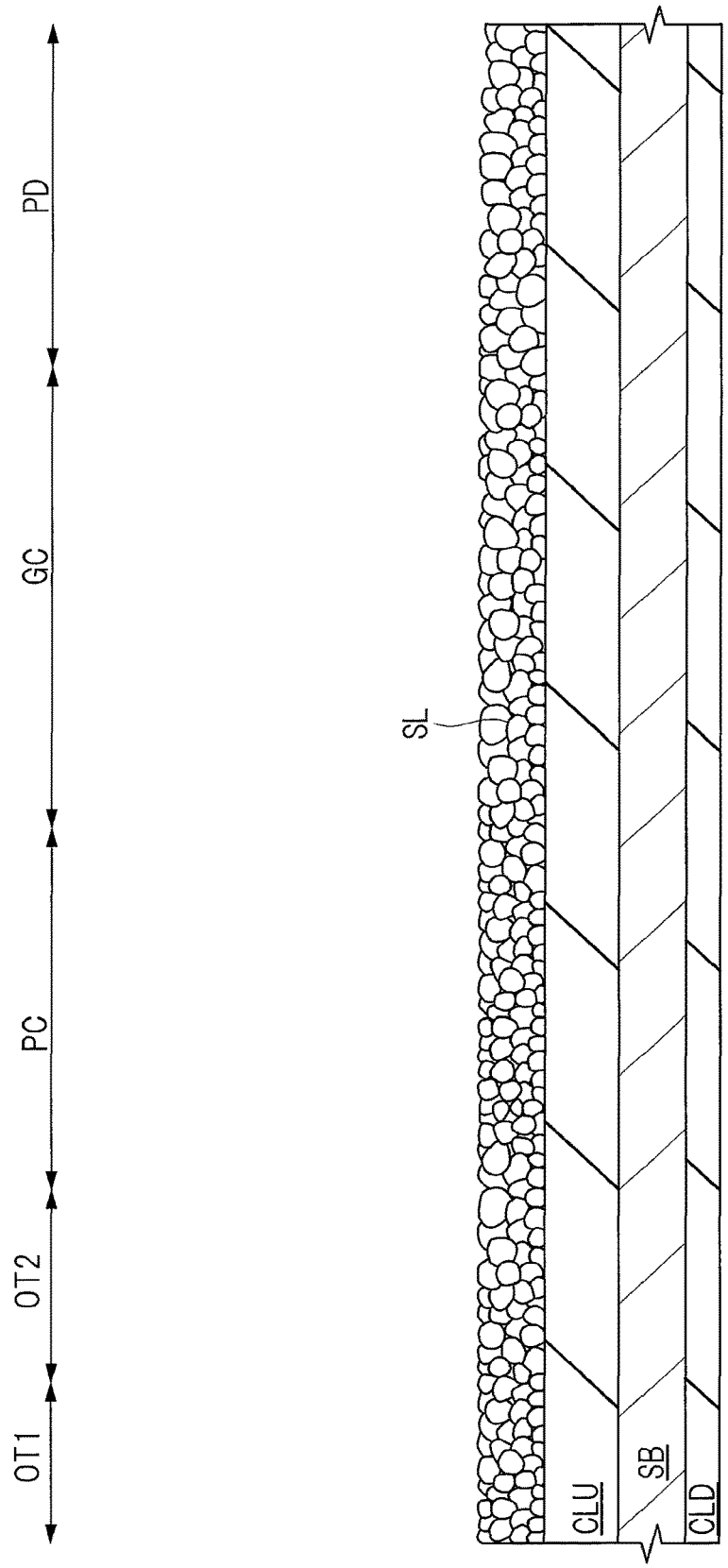

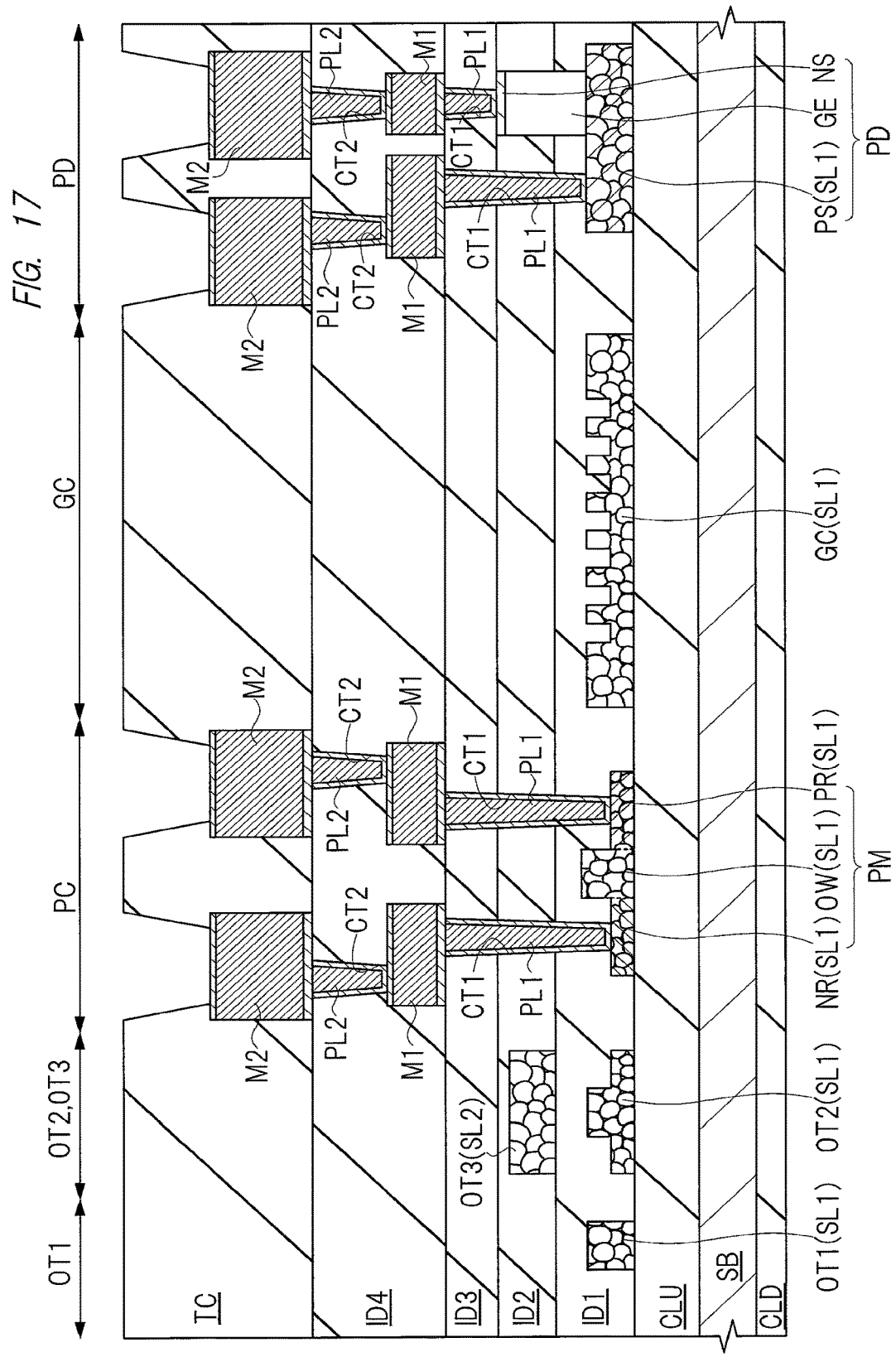

SEMICONDUCTOR DEVICE AND METHOD FOR MANUFACTURING SAME

CROSS-REFERENCE TO RELATED APPLICATION

The present application claims priority from Japanese Patent Application No. 2015-158187 filed on Aug. 10, 2015, the content of which is hereby incorporated by reference into this application.

TECHNICAL FIELD OF THE INVENTION

The present invention relates to a semiconductor device and a method for manufacturing the semiconductor device, and is suitably applicable, for example, to a semiconductor device into which a silicon photonics device is incorporated.

BACKGROUND OF THE INVENTION

Properties of an optical waveguide made of silicon nitride, amorphous silicon, or polycrystalline silicon are described in S. Zhu et al., "CMOS-Compatible Deposited Materials for Photonic Layers Integrated above Electronic Integrated Circuit," International Scholarly and Scientific Research & Innovation 7(9), 716-719 (2013) (Non-Patent Document 1).

SUMMARY OF THE INVENTION

An optical waveguide made of a polycrystalline silicon film instead of a monocrystalline silicon film has been studied for the purpose of achieving a reduction in cost or multi-layering of an optical waveguide used in a silicon photonics technique. However, for example, a polycrystalline silicon film formed by an LPCVD (Low Pressure Chemical Vapor Deposition) method, or a polycrystalline silicon film formed by performing thermal treatment on an amorphous silicon film has a problem of scattering (grain scattering, interface scattering) of light on a grain interface or scattering (surface scattering) of light caused by surface morphology (surface roughness) of the polycrystalline silicon film, and there is concern for a degradation of optical properties of an optical waveguide made of a polycrystalline silicon film.

The other problems and novel characteristics of the present invention will be apparent from the description of the present specification and the accompanying drawings.

A semiconductor device according to an embodiment of the present invention includes: a semiconductor substrate; a first insulating film formed on a main surface of the semiconductor substrate; an optical waveguide formed on an upper surface of the first insulating film; and a second insulating film formed on the upper surface of the first insulating film so as to cover the optical waveguide. The optical waveguide is made of polycrystalline silicon, crystal grains of the polycrystalline silicon exposed on an upper surface of the optical waveguide include crystal grains having flat surfaces parallel to the main surface of the semiconductor substrate, and crystal grains of the polycrystalline silicon exposed on side surfaces of the optical waveguide include crystal grains having flat surfaces perpendicular to the main surface of the semiconductor substrate.

A method for manufacturing a semiconductor device according to an embodiment of the present invention includes the steps of: preparing a substrate in which a first insulating film is formed on a main surface of a semiconductor substrate; forming a polycrystalline silicon film on an upper surface of the first insulating film; performing thermal treatment at a temperature higher than a growth temperature of the polycrystalline silicon film; planarizing an upper surface of first polycrystalline silicon film; and forming an optical waveguide by forming a resist mask on the upper surface of the polycrystalline silicon film, and then by processing the polycrystalline silicon film with use of the resist mask as an etching mask. Here, crystal grains exposed on the upper surface of the polycrystalline silicon film are processed so as to have flat surfaces parallel to the main surface of the semiconductor substrate, and crystal grain exposed on side surfaces of the polycrystalline silicon film are processed so as to have flat surfaces perpendicular to the main surface of the semiconductor substrate.

According to an embodiment of the present invention, good optical properties can be achieved in an optical waveguide made of polycrystalline silicon.

BRIEF DESCRIPTIONS OF THE DRAWINGS

FIG. 5 is a main part cross-sectional view of an optical device (optical signal line, grating coupler, optical modulator and germanium optical receiver) in manufacturing steps according to the first embodiment.

FIGS. 6A, 6B, 6C, and 6D are main part cross-sectional views for describing steps of forming an optical waveguide having a rib structure according to the first embodiment.

Figure 7:
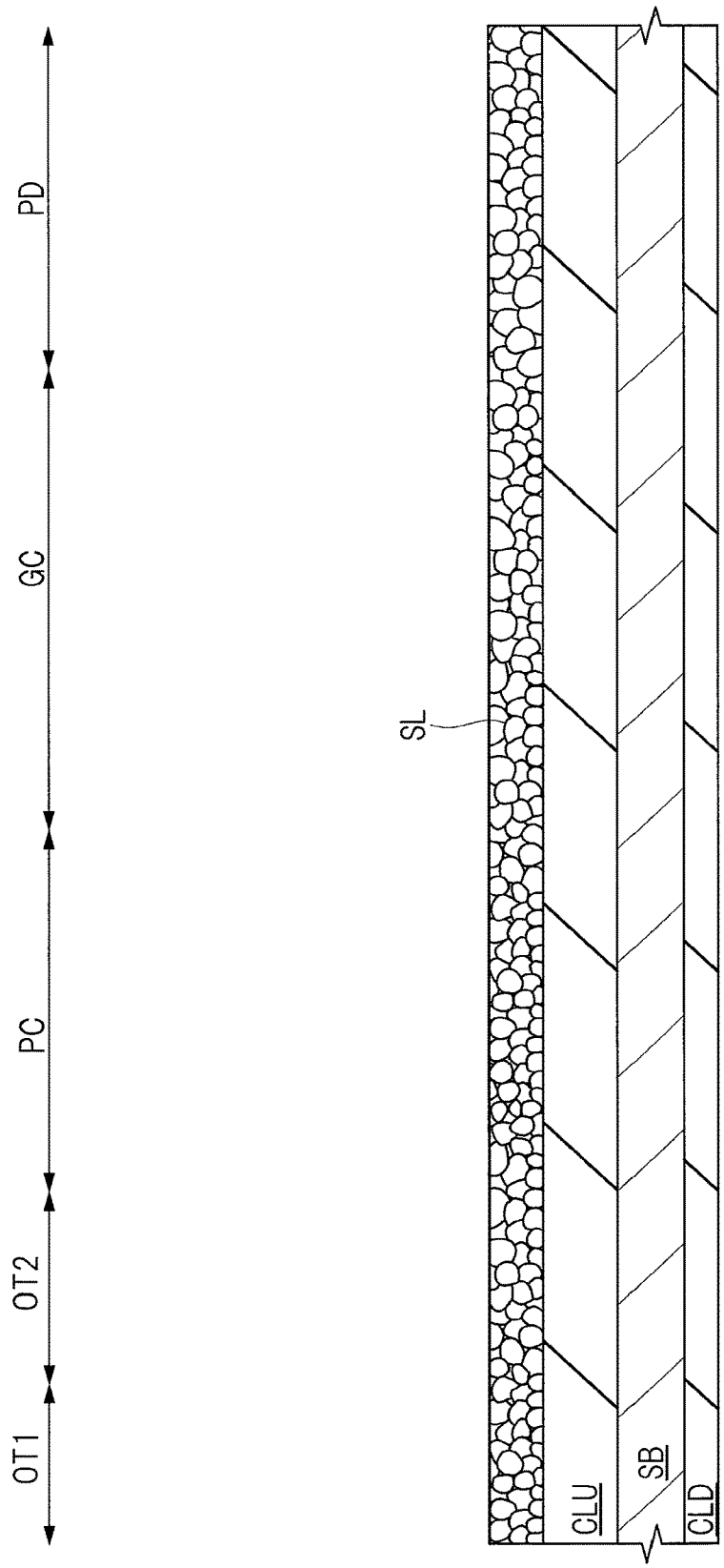

FIG. 7 is a main part cross-sectional view illustrating the manufacturing steps of the optical device, following the steps in FIG. 5.

Figure 8:
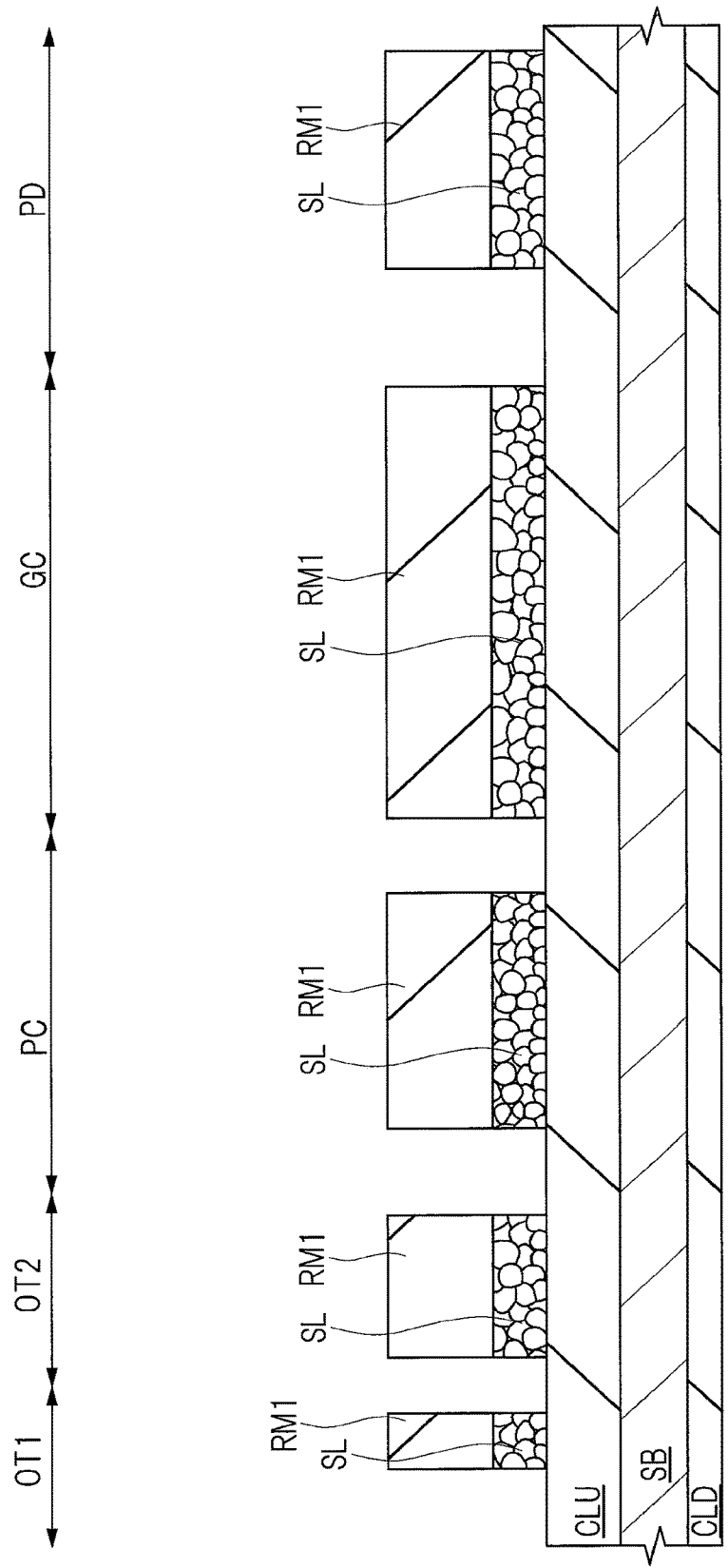

FIG. 8 is a main part cross-sectional view illustrating the manufacturing steps of the optical device, following the steps in FIG. 7.

Figure 9:
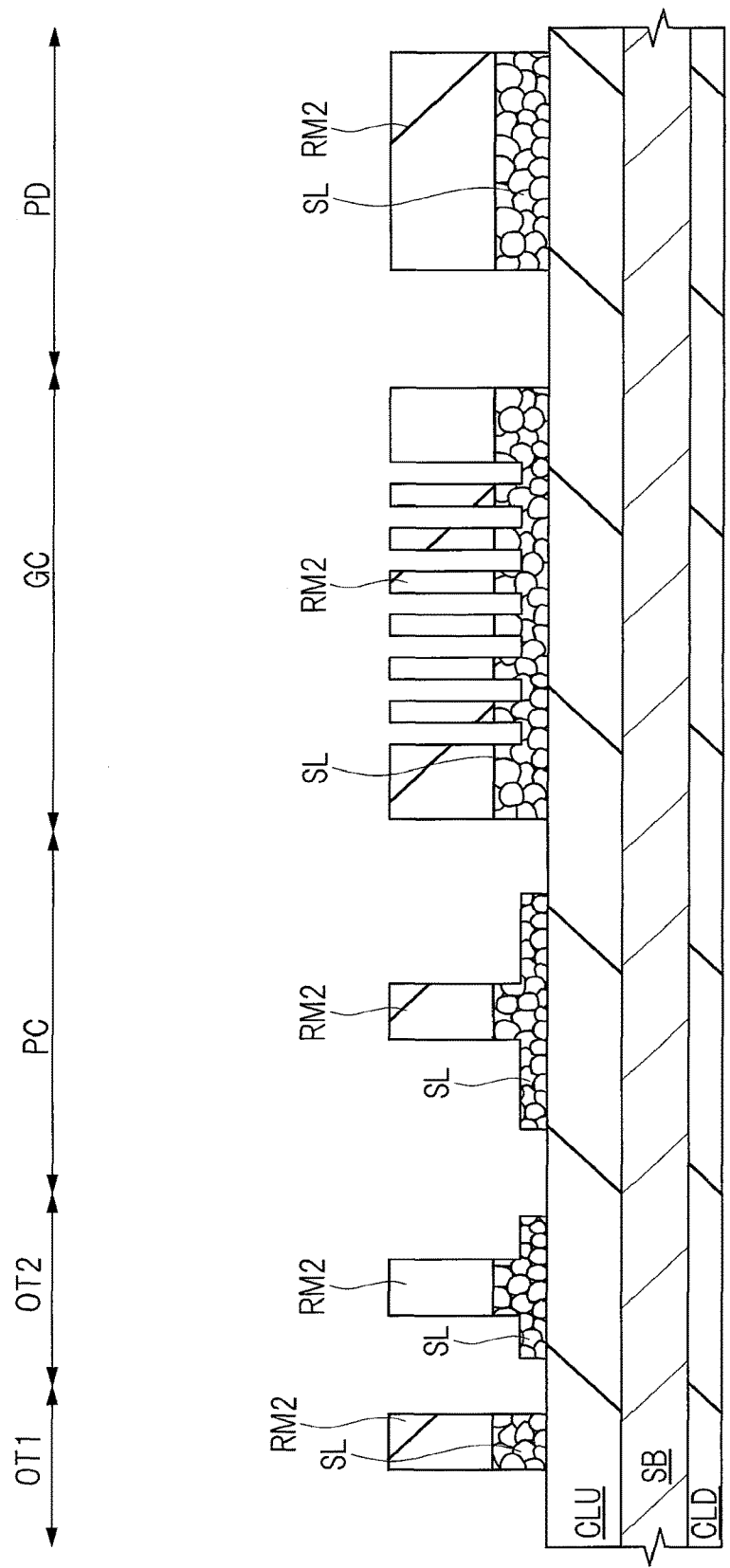

FIG. 9 is a main part cross-sectional view illustrating the manufacturing steps of the optical device, following the steps in FIG. 8.

Figure 10:
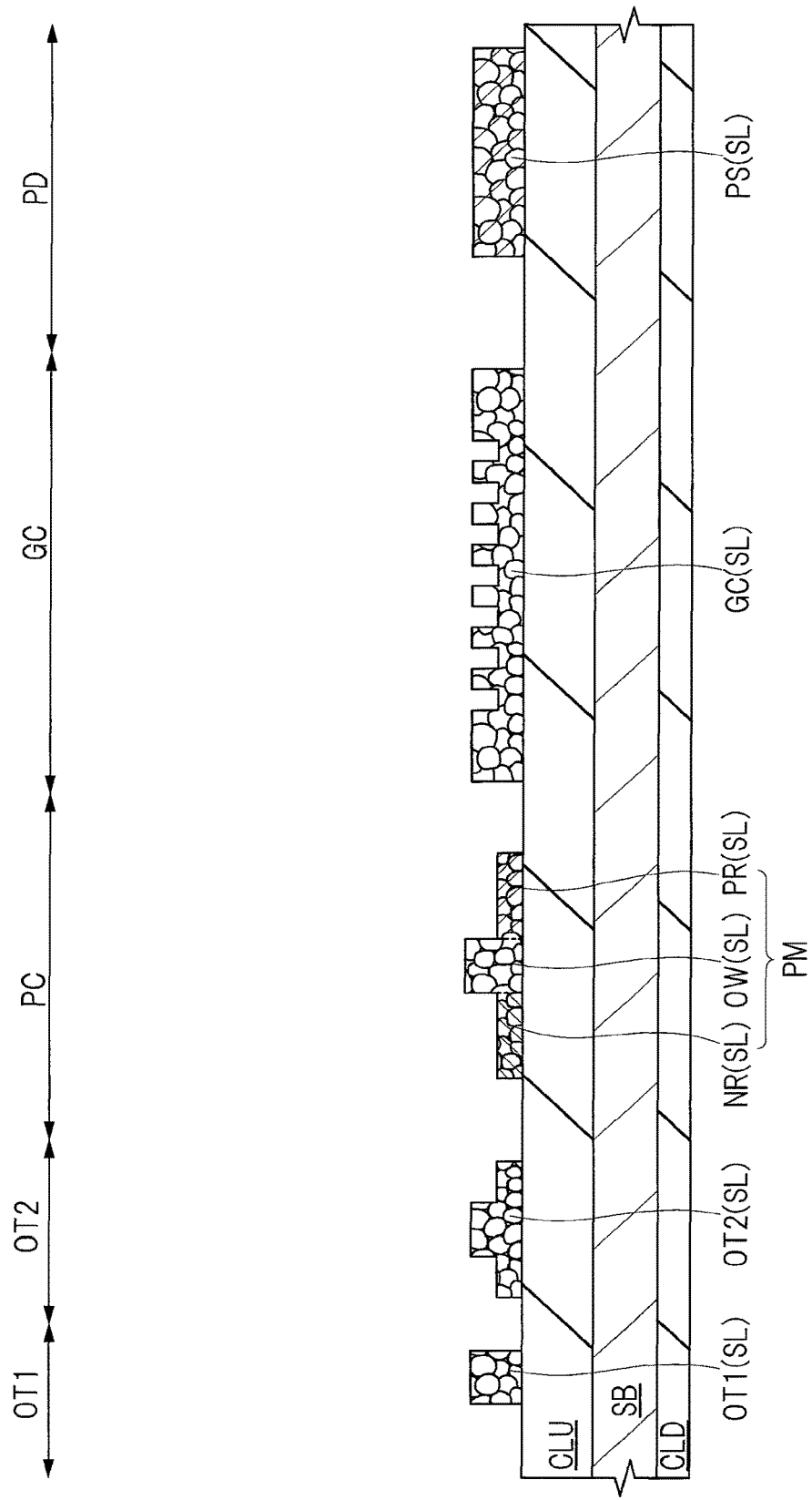

FIG. 10 is a main part cross-sectional view illustrating the manufacturing steps of the optical device, following the steps in FIG. 9.

Figure 11:
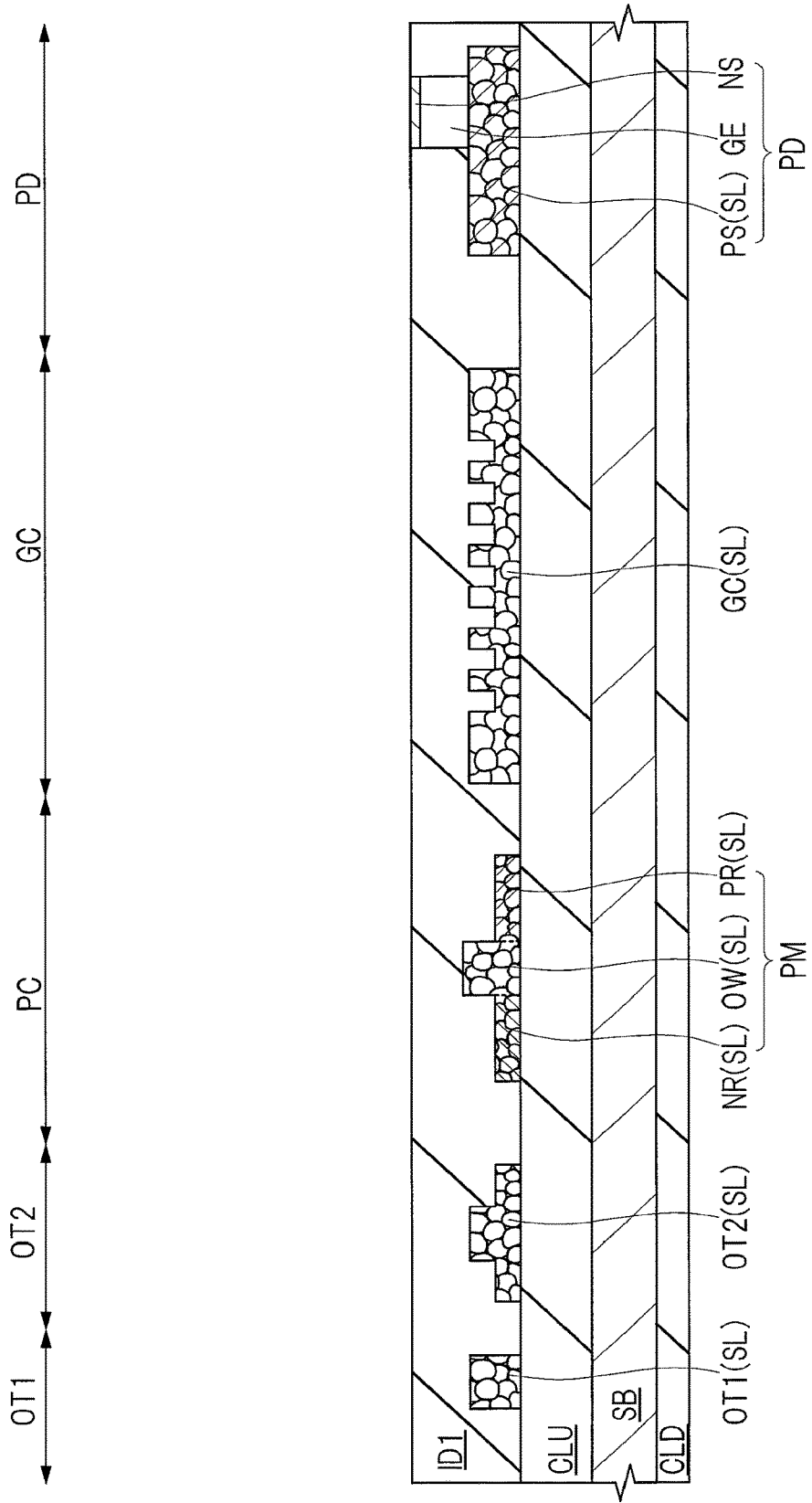

FIG. 11 is a main part cross-sectional view illustrating the manufacturing steps of the optical device, following the steps in FIG. 10.

Figure 12:
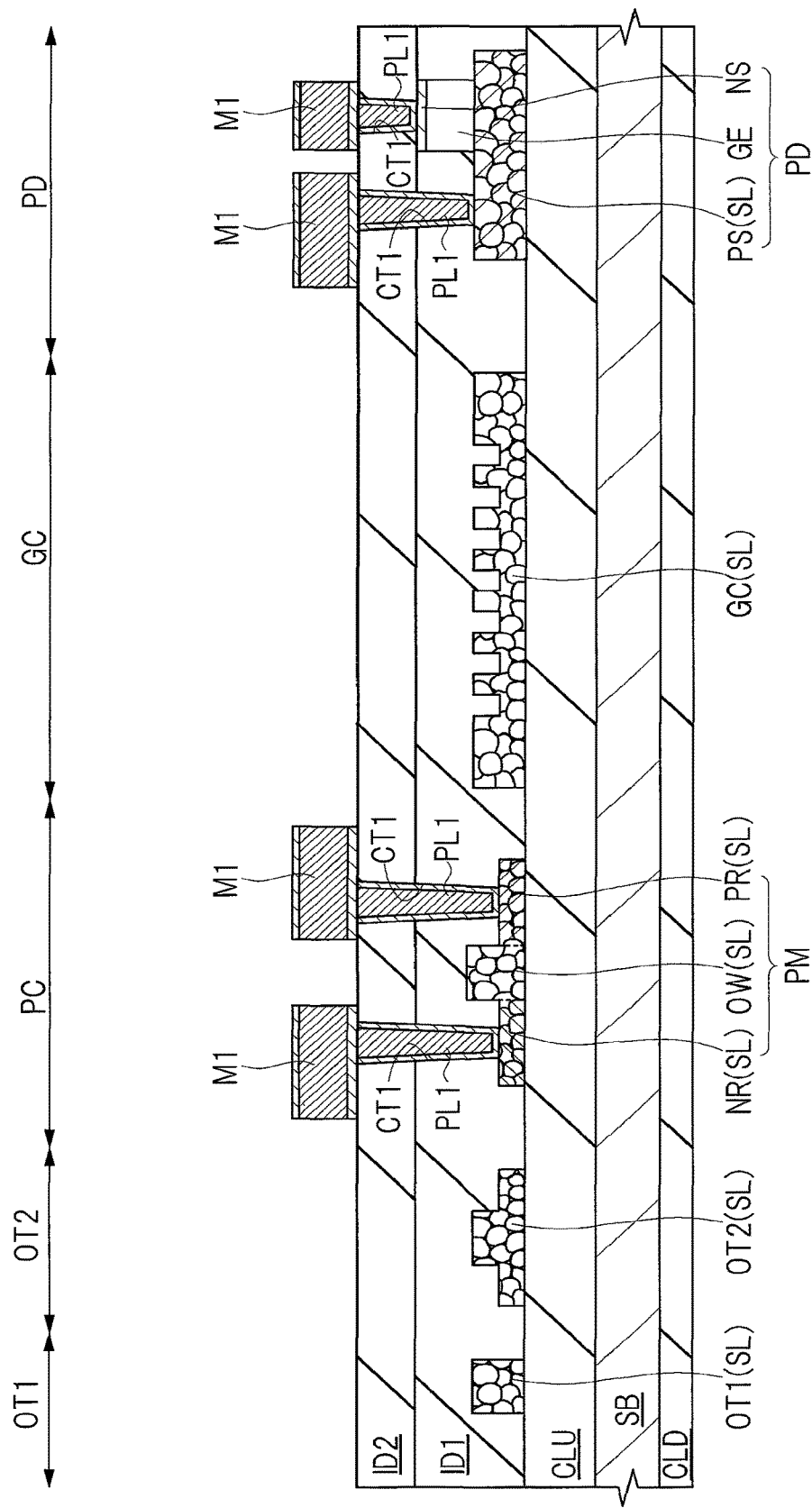

FIG. 12 is a main part cross-sectional view illustrating the manufacturing steps of the optical device, following the steps in FIG. 11.

Figure 13:
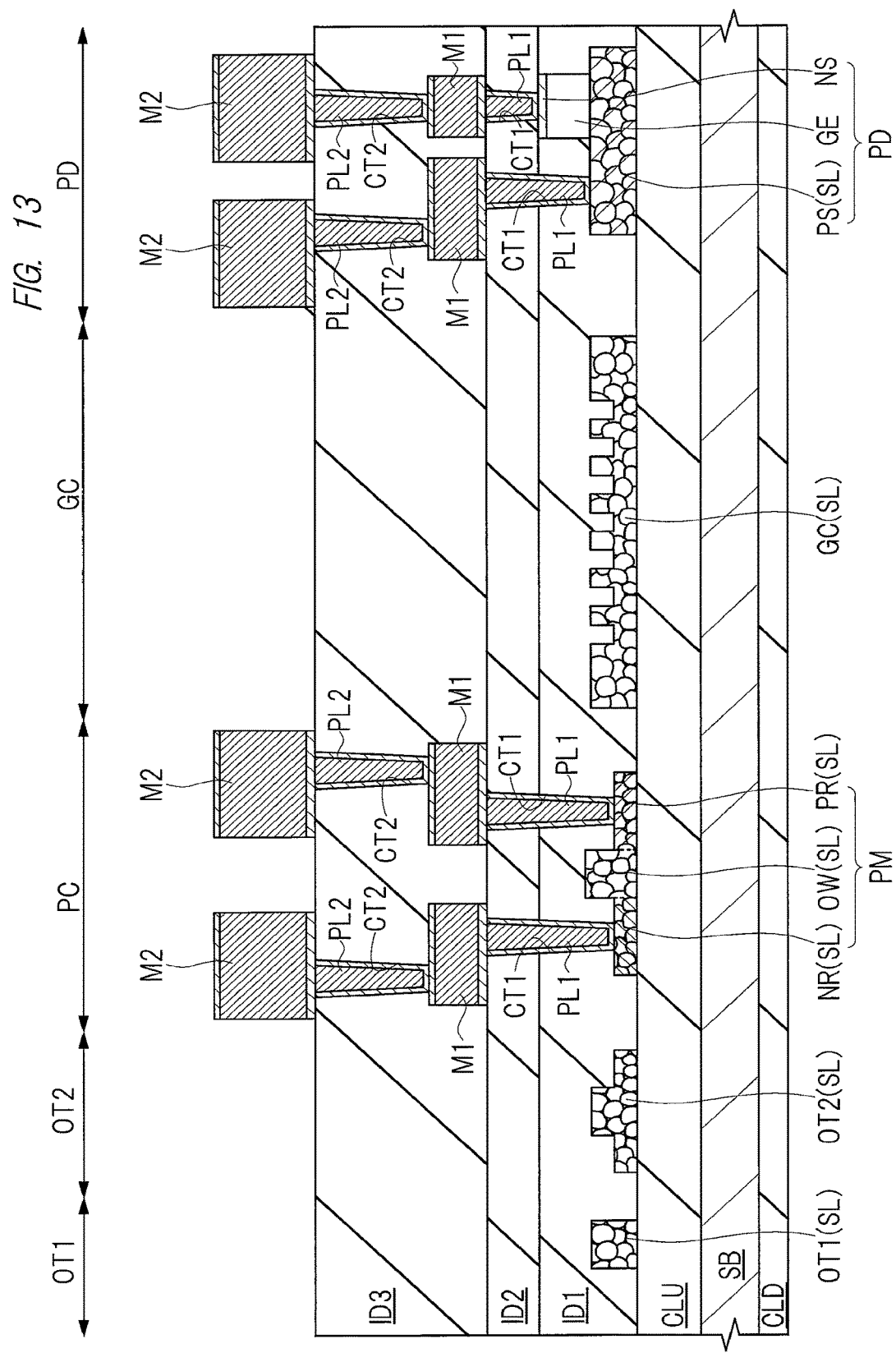

FIG. 13 is a main part cross-sectional view illustrating the manufacturing steps of the optical device, following the steps in FIG. 12.

Figure 14:
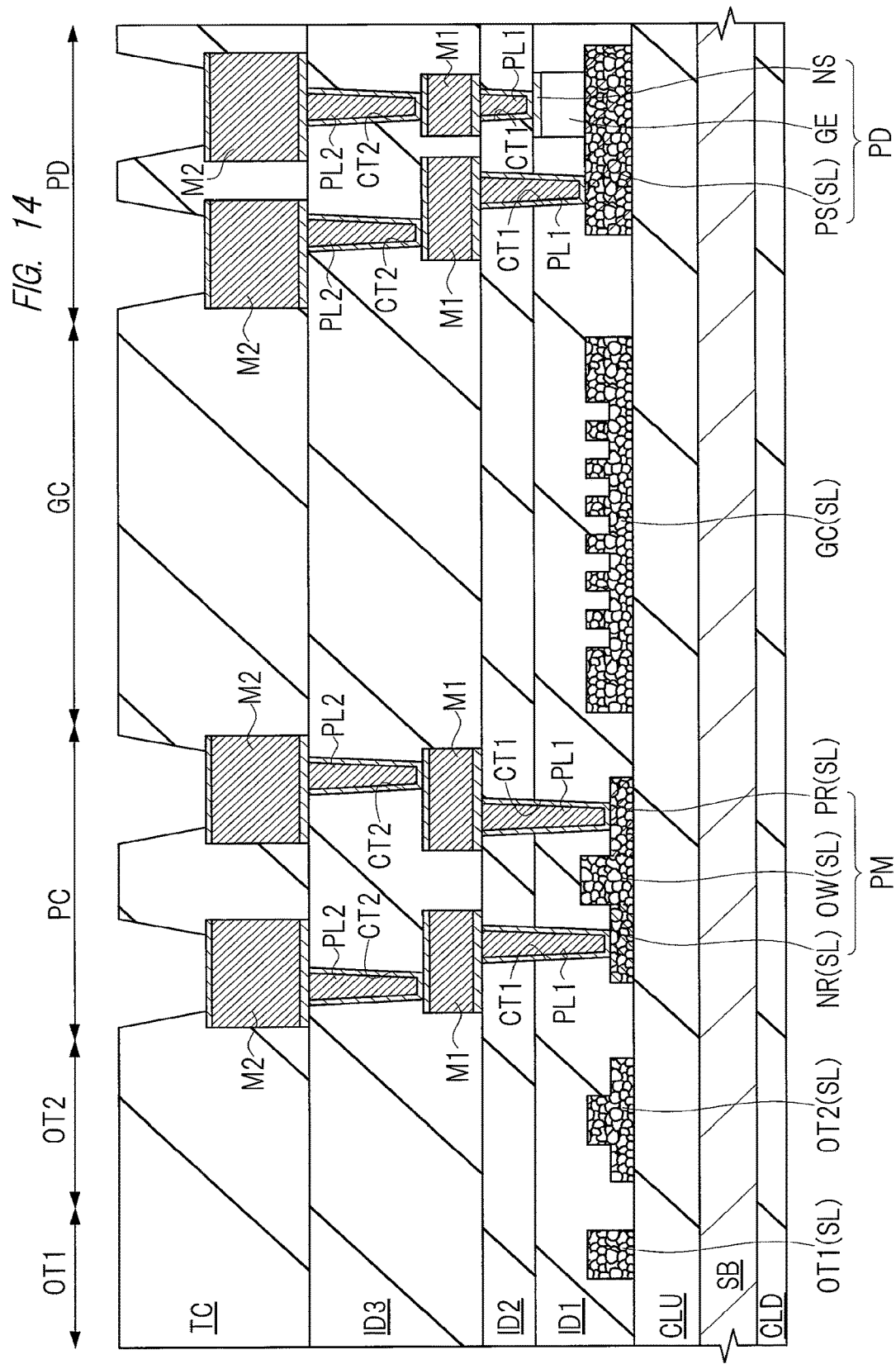

FIG. 14 is a main part cross-sectional view illustrating a first optical signal line, a second optical signal line, a grating coupler, a phase modulating part of an optical modulator, and a germanium optical receiver according to a second embodiment of the present invention.

FIGS. 15A, 15B, 15C, and 15D are main part cross-sectional views for describing steps of forming an optical waveguide having a rib structure according to the second embodiment.

Figure 15A:
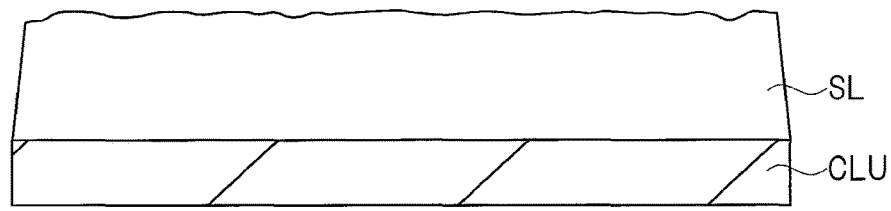
Figure 15B:
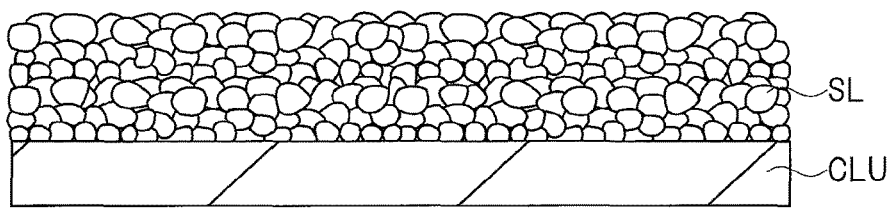
Figure 15C:
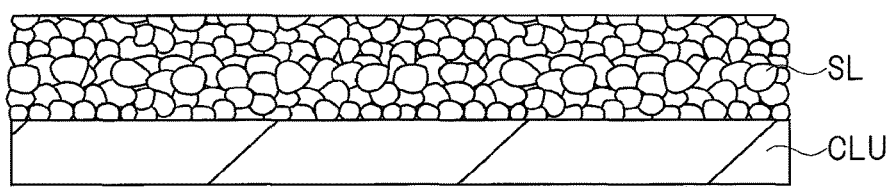
Figure 15D:
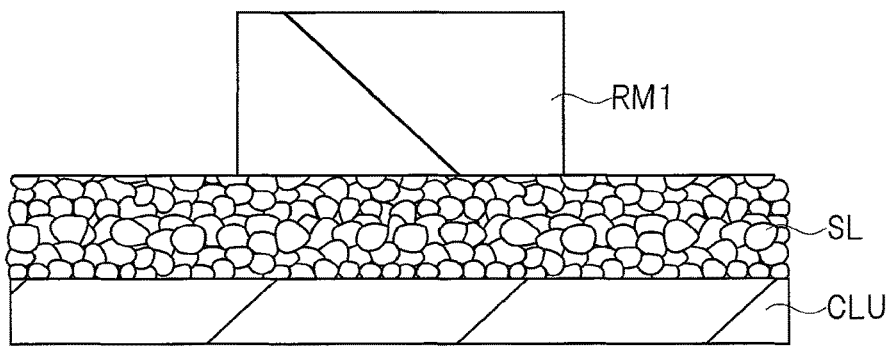
Figure 16E:
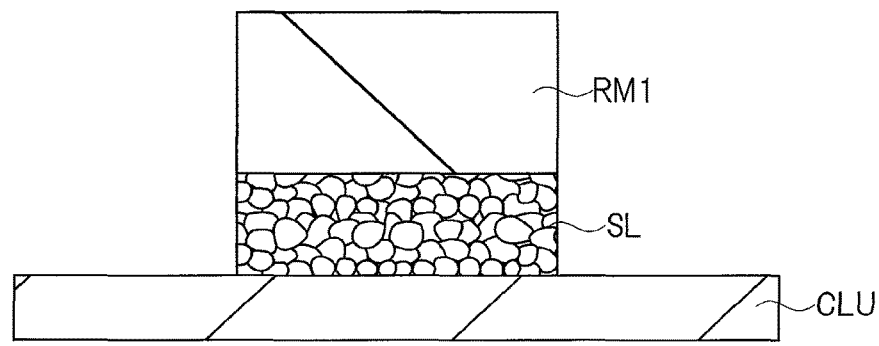
Figure 16F:
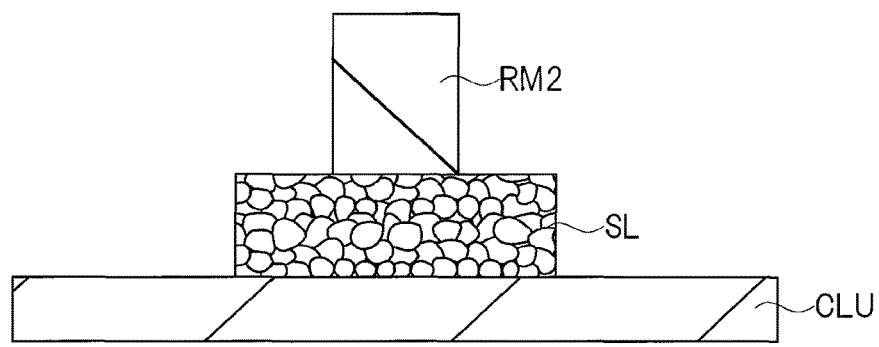
Figure 16G:
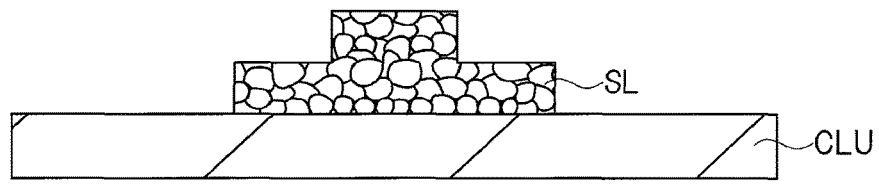

FIGS. 16E, 16F, and 16G are main part cross-sectional views for describing steps, following the steps in FIG. 15, of forming the optical waveguide having a rib structure according to the second embodiment.

FIG. 17 is a main part cross-sectional view illustrating a first optical signal line, a second optical signal line, a third optical signal line, a grating coupler, a phase modulating part of an optical modulator, and a germanium optical receiver according to a third embodiment.

Figure 18:
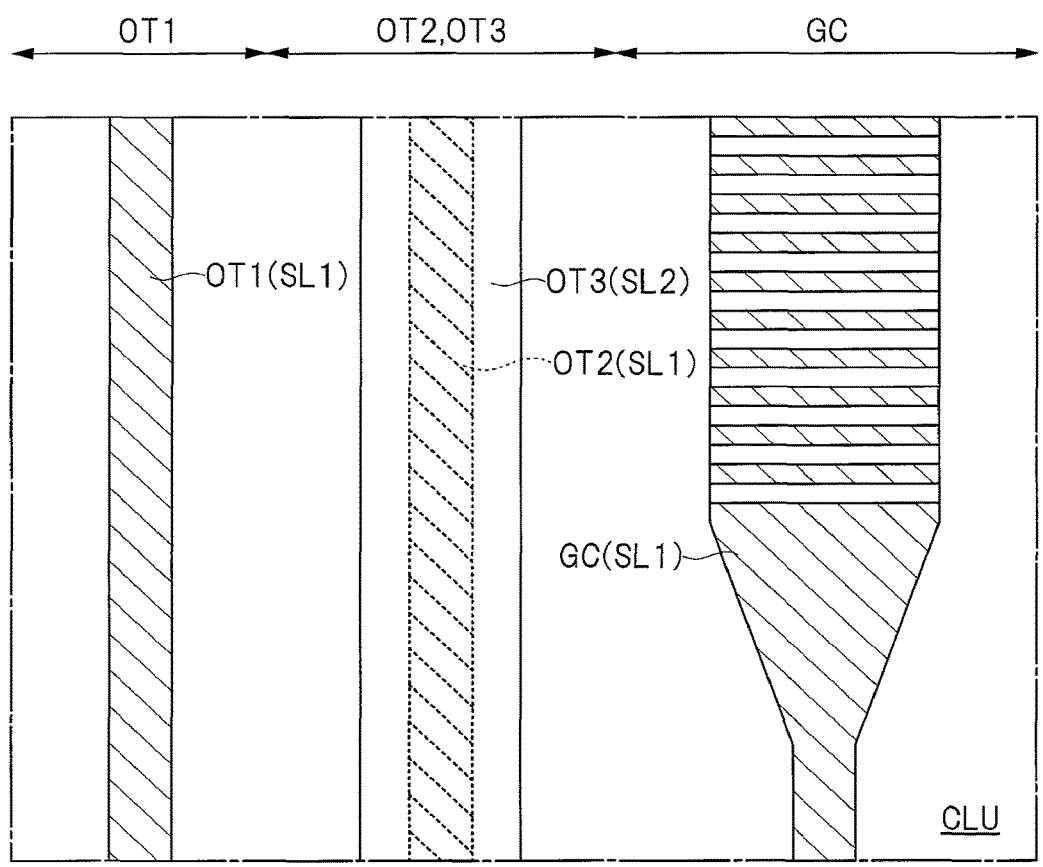

FIG. 18 is a main part top view illustrating the first optical signal line, the second optical signal line, the third optical signal line, and the grating coupler according to a third embodiment of the present invention.

Figure 19:
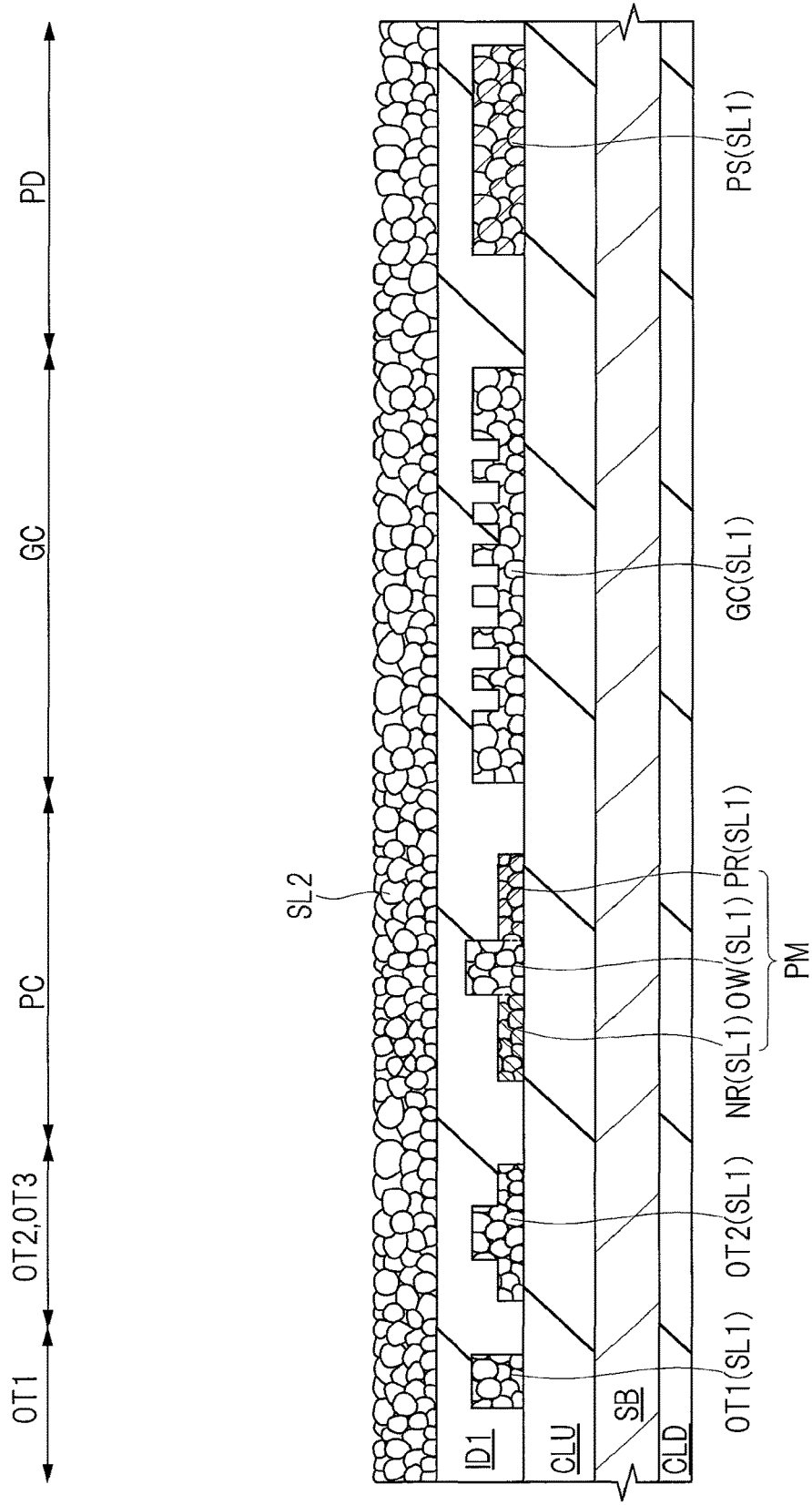

FIG. 19 is a main part cross-sectional view of an optical device (optical signal line, grating coupler, optical modulator and germanium optical receiver) in manufacturing steps according to the third embodiment.

Figure 20:
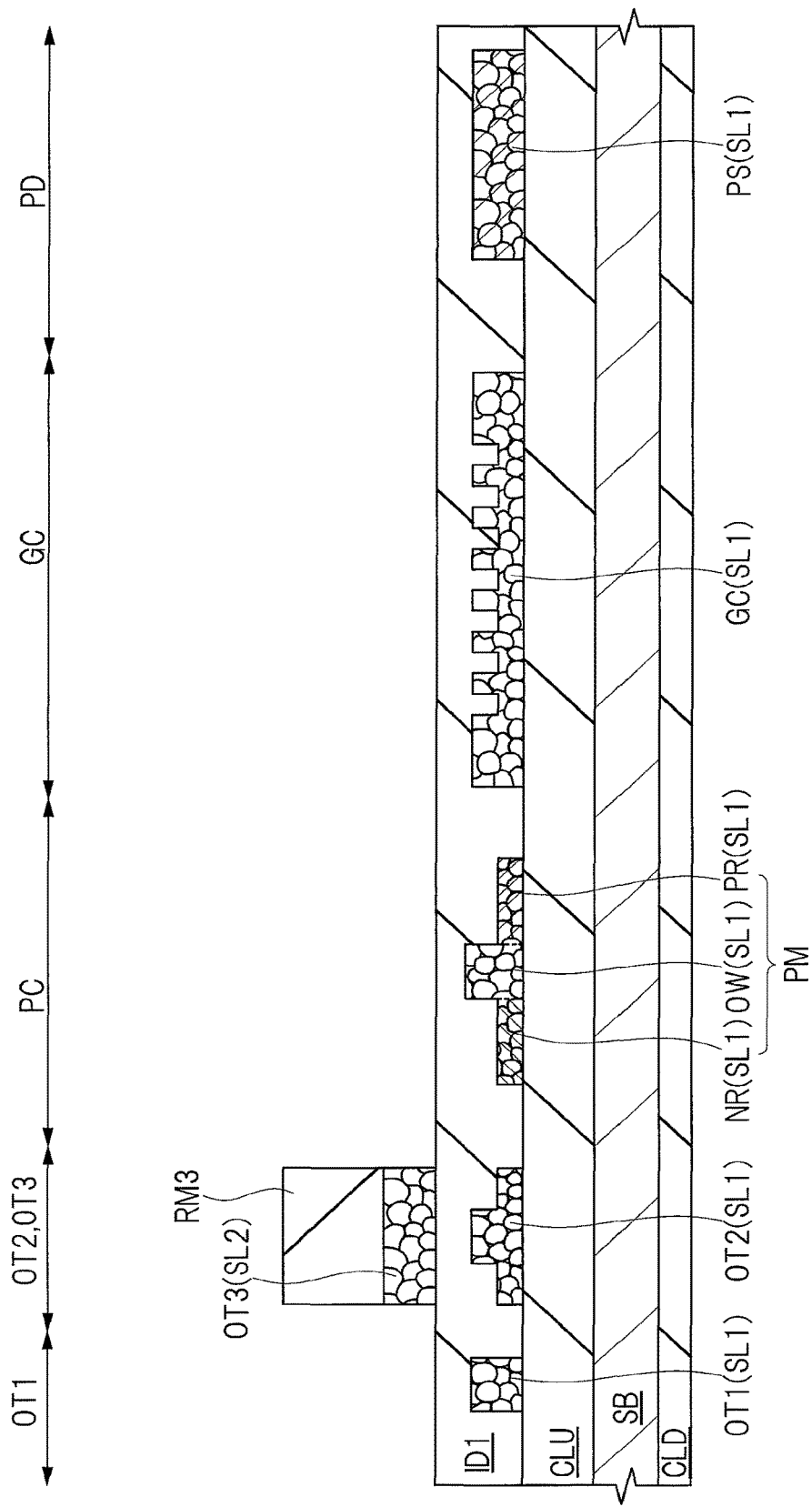

FIG. 20 is a main part cross-sectional view illustrating the manufacturing steps of the optical device, following the steps in FIG. 19.

Figure 21:
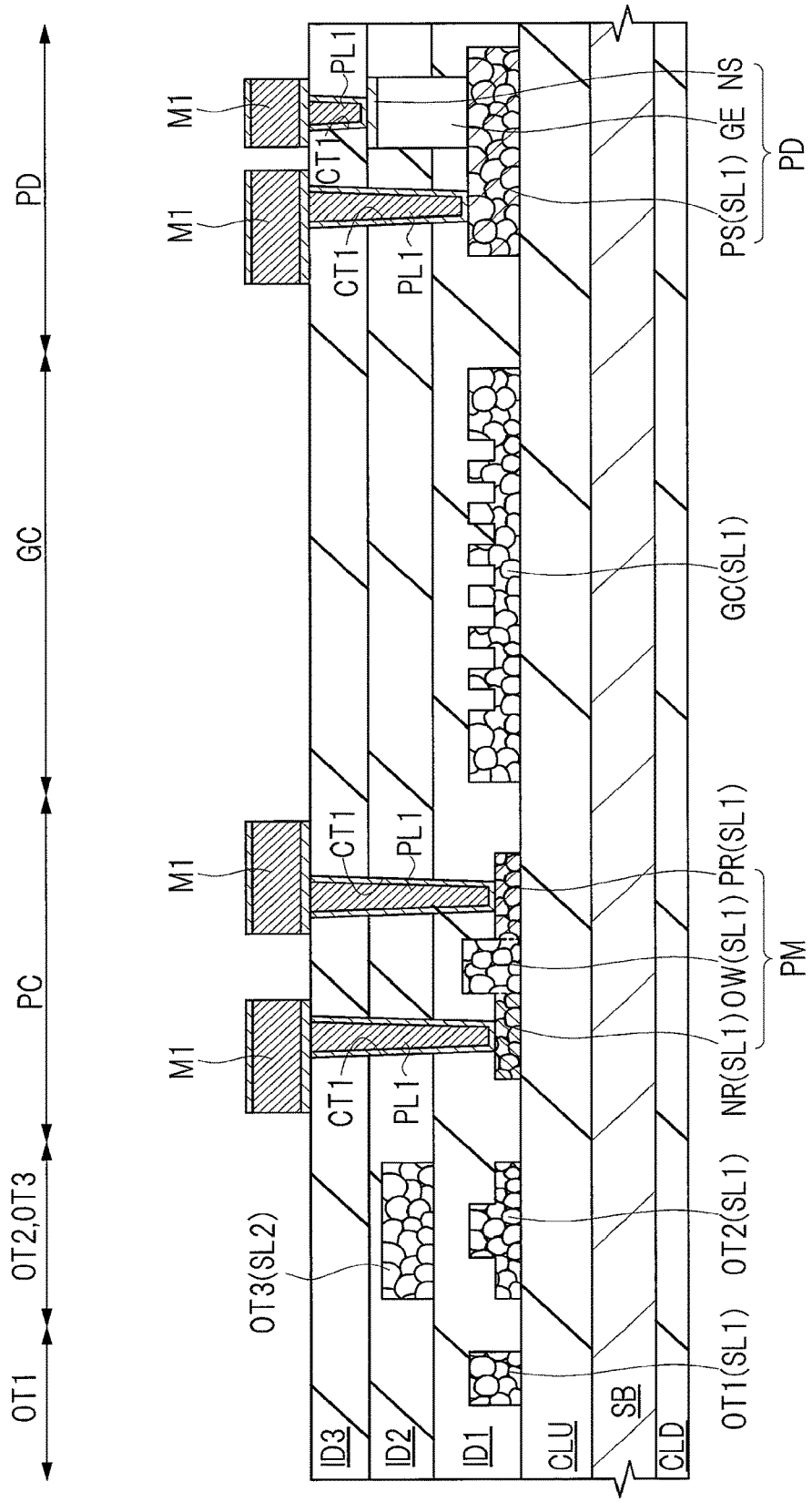

FIG. 21 is a main part cross-sectional view illustrating the manufacturing steps of the optical device, following the steps in FIG. 20.

Figure 22:
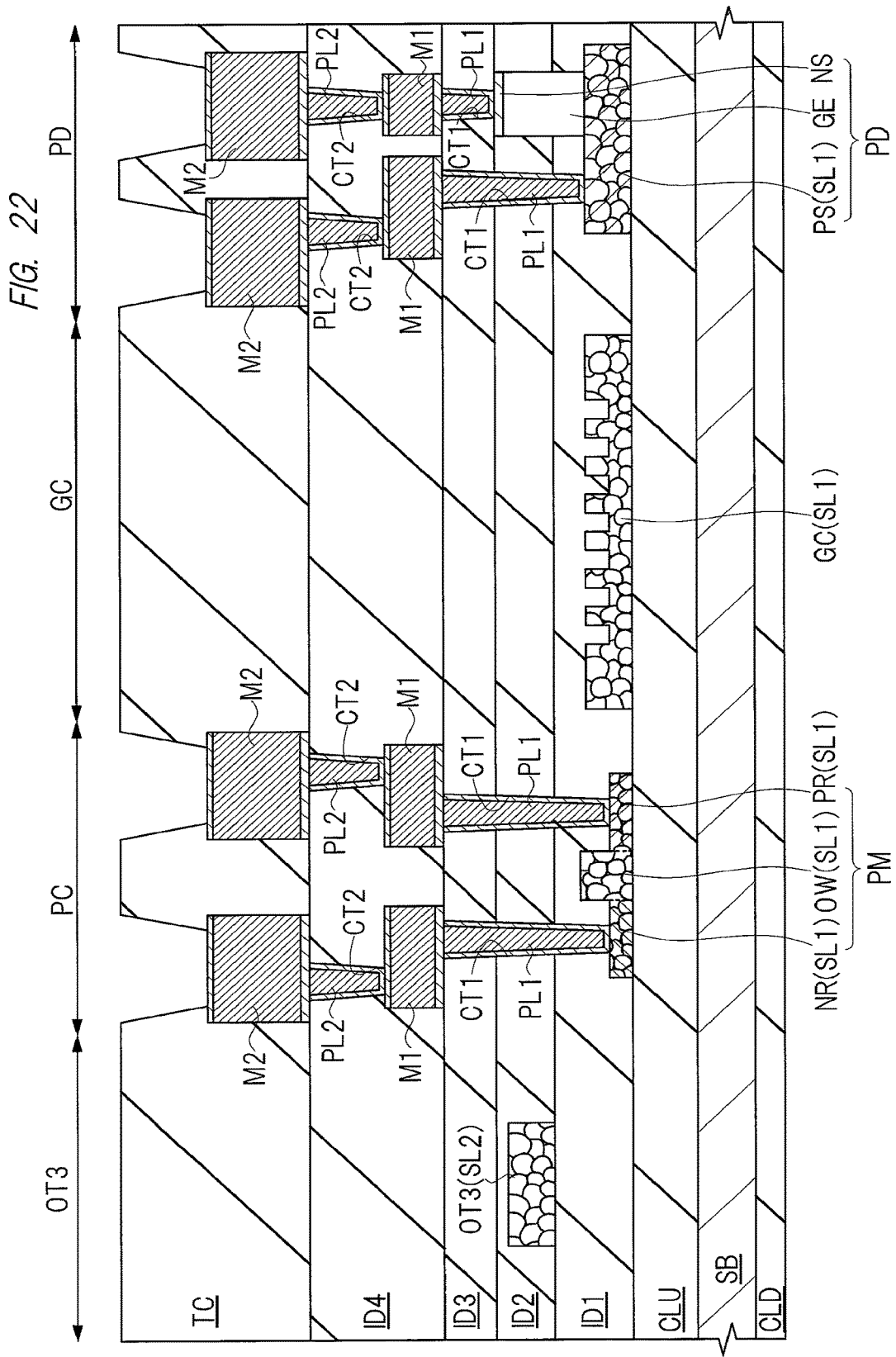

FIG. 22 is a main part cross-sectional view illustrating a third optical signal line, a grating coupler, a phase modulating part of an optical modulator, and a germanium optical receiver according to a first modification example of the third embodiment.

Figure 23:
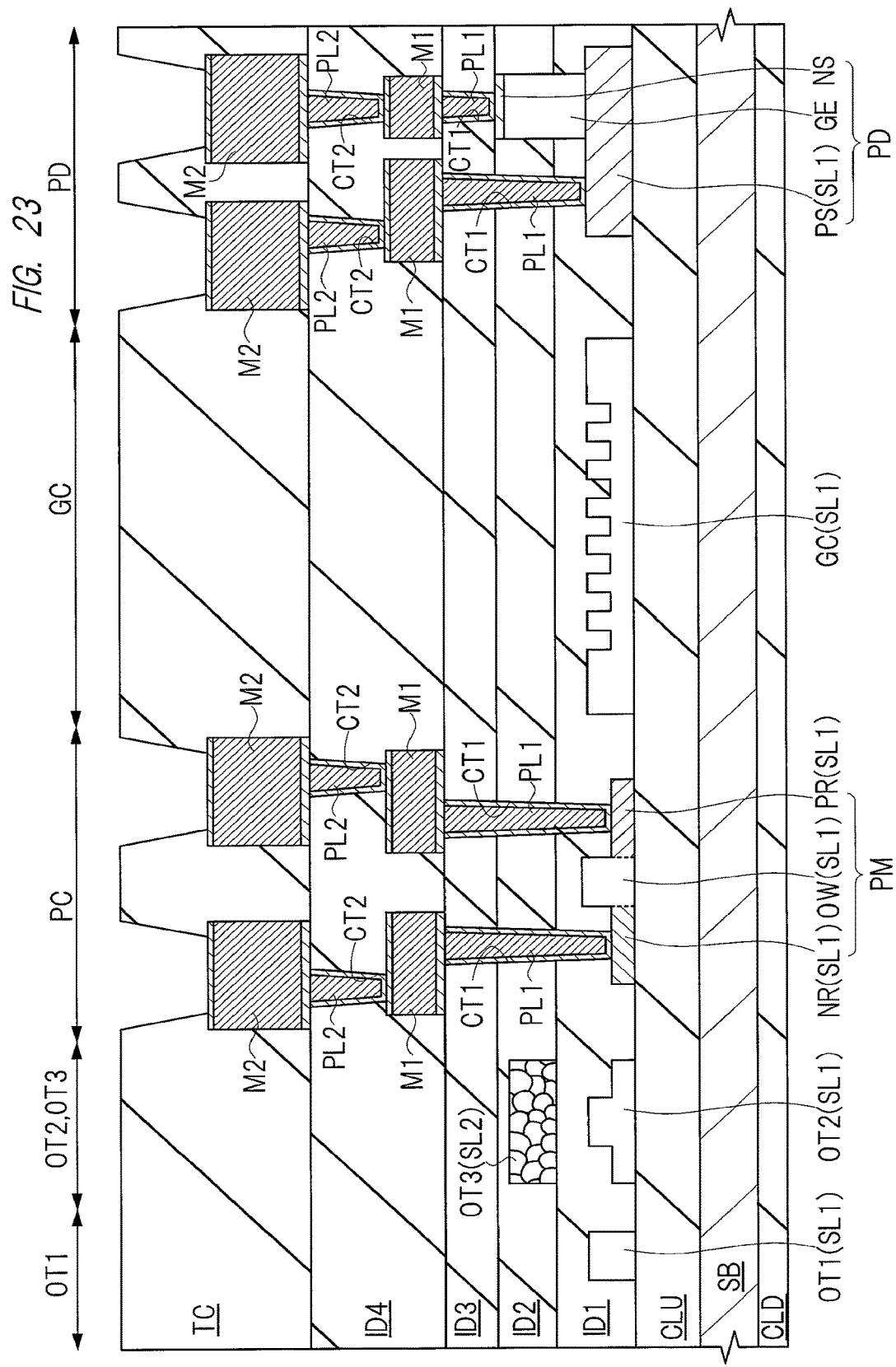

FIG. 23 is a main part cross-sectional view illustrating a first optical signal line, a second optical signal line, a third optical signal line, a grating coupler, a phase modulating part of an optical modulator, and a germanium optical receiver according to a second modification example of the third embodiment.

Figure 24:
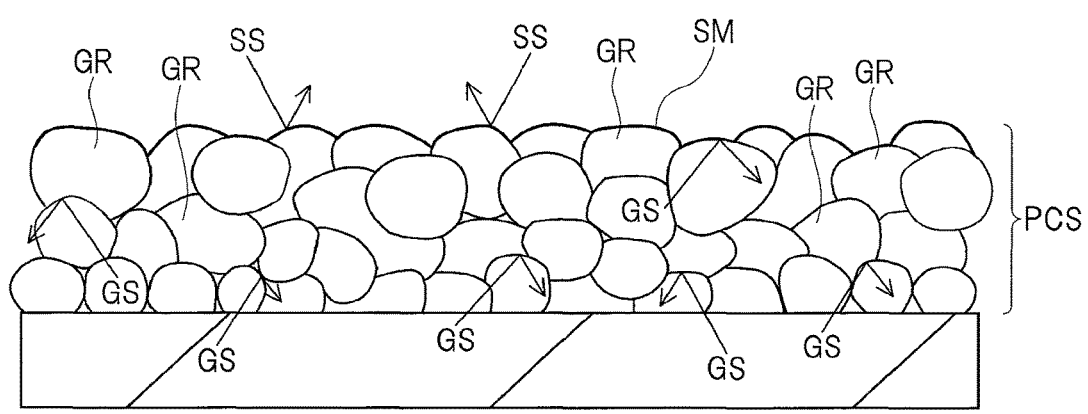

FIG. 24 is a schematic view for describing scattering of light in a polycrystalline silicon film.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Further, in the embodiments described below, when referring to the number of elements (including number of pieces, values, amount, range, and the like), the number of the elements is not limited to a specific number unless otherwise stated or except the case where the number is apparently limited to a specific number in principle.

Further, in the embodiments described below, it goes without saying that the components (including element steps) are not always indispensable unless otherwise stated or except the case where the components are apparently indispensable in principle.

It is obvious that expressions "composed of A", "made up of A", "having A", and "including A" do not exclude elements other than an element A, except a case where these expressions are defined as expressions that refer exclusively to the sole element A. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, in some drawings used in the embodiments described below, hatching is used even in a plan view so as to make the drawings easy to see. Further, components having the same function are denoted by the same reference symbols in principle throughout all drawings for describing the embodiments described below, and the repetitive description thereof is omitted. Hereinafter, the embodiments of the present invention will be explained in detail based on the drawings.

In recent years, a development for realizing a technique of an optical-communication module have been actively carried out by manufacturing optical signal transmission lines made of silicon, and then integrating various optical devices and electronic devices with the use of an optical circuit including the optical signal transmission lines as a platform. Such a technique is known as a silicon photonics technique.

The technique disclosed in the present embodiment is one applied to an optical device in particular, among various devices that constitute a semiconductor device using a silicon photonics technique. Thus, in the following description, structures of optical devices integrated on an SOI (Silicon On Insulator) substrate and a method for manufacturing the optical devices are described. Furthermore, in the following description, a transmission line for optical signal (hereinafter referred to as an optical signal line), a grating coupler, an optical modulator, and an optical receiver among various optical devices are mainly exemplified, and a multilayer wiring having a two-layer structure is exemplified, but the present embodiment is not limited to these ones.

First, problems of an optical waveguide made of a polycrystalline silicon film that have been found by the inventor of the present invention will be described with reference to FIG. 24 because a structure of an optical waveguide according to the present embodiment is made clearer. FIG. 24 is a schematic view for describing scattering of light in a polycrystalline silicon film.

(1) In a case where an optical waveguide made of a polycrystalline silicon film PCS is used, scattering (hereinafter referred to as grain scattering) GS of light on crystal grains GR is less likely to occur as the crystal grains GR become larger, as illustrated in FIG. 24. However, as the crystal grains GR become larger, surface morphology SM of the polycrystalline silicon film PCS becomes larger, and light scattering SS (hereinafter referred to as surface scattering) is more likely to occur on a surface of the polycrystalline silicon film PCS. Conventionally, it is therefore difficult to suppress both grain scattering GS and surface scattering SS at the same time.

Furthermore, in a case where the polycrystalline silicon film PCS having large surface morphology SM is processed by dry etching with use of a photoresist as a mask and then the photoresist is peeled off, the photoresist remains in a portion having large surface morphology SM, and surface scattering SS sometimes occurs due to a residue of an organic substance. As a result, a degradation of optical properties of the optical waveguide occurs.

(2) A polycrystalline silicon film PCS having a uniform crystal grain diameter can be formed by growing crystal grains of silicon (Si) of a micro size through thermal treatment at a temperature equal to or higher than a growth temperature, for example, approximately 600° C. to 1000° C. after formation of an amorphous silicon film. However, in a case where the crystal grains grow, the surface morphology SM of the polycrystalline silicon film PCS becomes larger, and surface scattering SS is more likely to occur on a surface of the polycrystalline silicon film PCS.

The present embodiment aims to provide an optical waveguide having good optical properties by forming an optical waveguide made of a polycrystalline silicon film in which crystal grains of polycrystalline silicon are large and surface morphology is small.

(First Embodiment)

<<Configuration of Semiconductor Device>>

Figure 1:
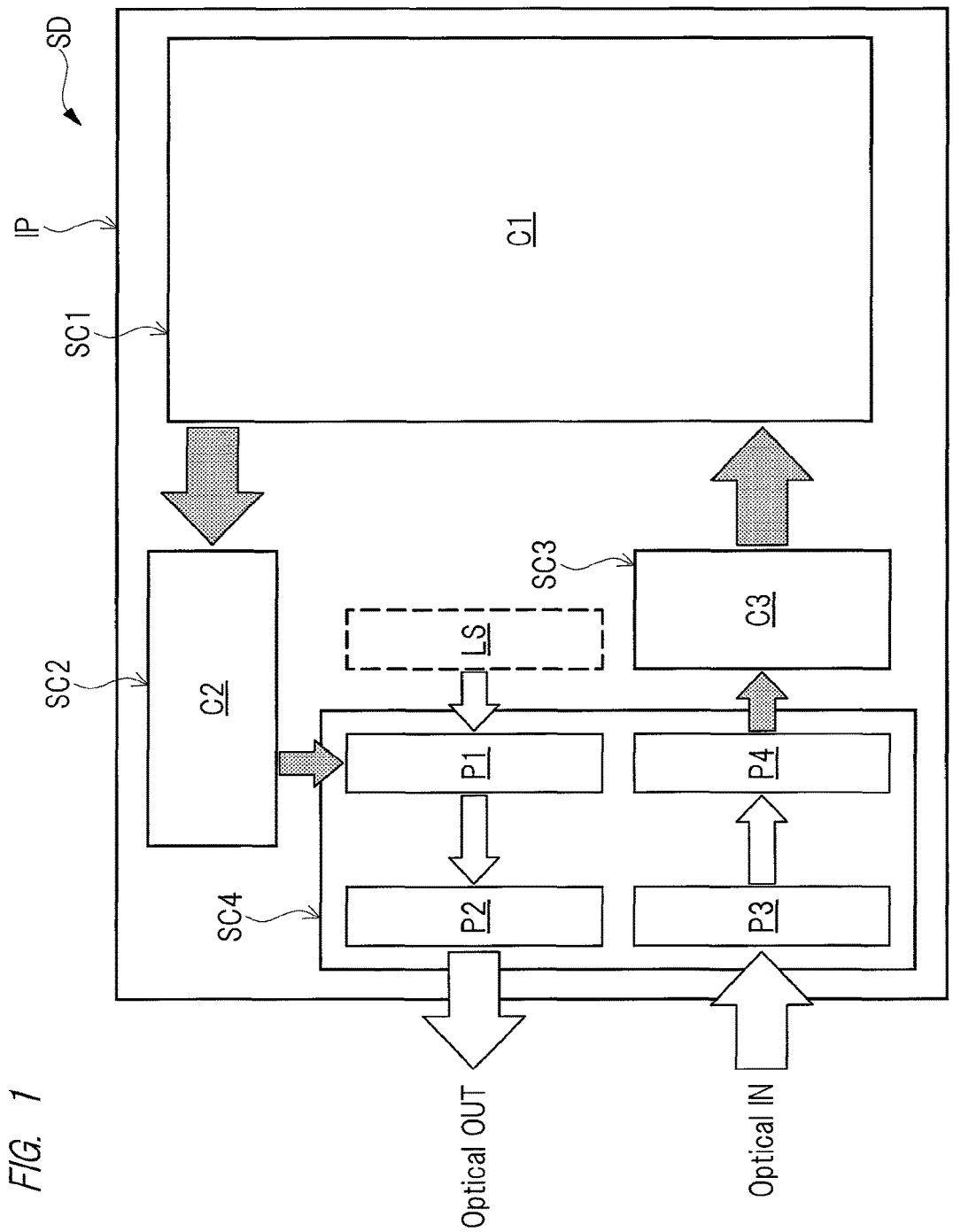
FIG. 1 is a schematic view illustrating an example of a configuration of a semiconductor device according to an first embodiment of the present invention.

An example of a configuration of a semiconductor device according to a first embodiment will be described with reference to FIG. 1. FIG. 1 is a schematic view illustrating an example of a configuration of the semiconductor device according to the first embodiment.

As illustrated in FIG. 1, data that is output from a silicon electronic circuit C1 in which a control circuit, or a memory circuit, or the like is formed is transmitted as an electric signal to an optical modulator P1 via a silicon electronic circuit (transceiver IC (Transceiver Integrated Circuit)) C2. The optical modulator P1 is an optical device that converts data transmitted as an electric signal into an optical signal. For example, continuous wave laser light from a light source LS is incident to the optical modulator P1. The data transmitted as an electric signal can be associated with a phase state of the light by manipulating a phase of the light in the optical modulator P1 and changing a state of the optical signal.

The optical signal modulated in the optical modulator P1 is output from a semiconductor device SD to an outside via an optical coupler P2 such as a grating coupler or a spot-size converter.

Meanwhile, an optical signal that is input to the semiconductor device SD is transmitted to an optical receiver P4 via an optical coupler P3 such as a grating coupler or a spot-size converter. The optical receiver P4 is an optical device that converts data transmitted as an optical signal into an electric signal. The data converted into an electric signal in the optical receiver P4 is transmitted to the silicon electronic circuit C1 via a silicon electronic circuit (receiver IC (Receiver Integrated Circuit)) C3.

An electric wiring mainly made of a conductive material such as aluminum (Al), copper (Cu), or tungsten (W) is used to transmit an electric signal from the silicon electronic circuit C1 to the optical modulator P1 via the silicon electronic circuit C2 and to transmit an electric signal from the optical receiver P4 to the silicon electronic circuit C1 via the silicon electronic circuit C3. Meanwhile, a transmission line for optical signal (hereinafter referred to as an optical signal line) made, for example, of a polycrystalline silicon film is used to transmit an optical signal.

The silicon electronic circuit C1, the silicon electronic circuit C2, and the silicon electronic circuit C3 are formed on semiconductor chips SC1, SC2, and SC3, respectively, and the optical modulator P1, the optical couplers P2 and P3, and the optical receiver P4 are formed on a semiconductor chip SC4. The semiconductor chips SC1, SC2, SC3, and SC4, and the light source LS are mounted, for example, on a single interposer IP and constitute the semiconductor device SD.

In the present embodiment, electronic devices and optical devices are formed on different semiconductor chips. However, the embodiment is not limited to this structure. For example, electronic devices and optical devices may be formed on one semiconductor chip.

<<Structures of Optical Devices>>

Figure 2:
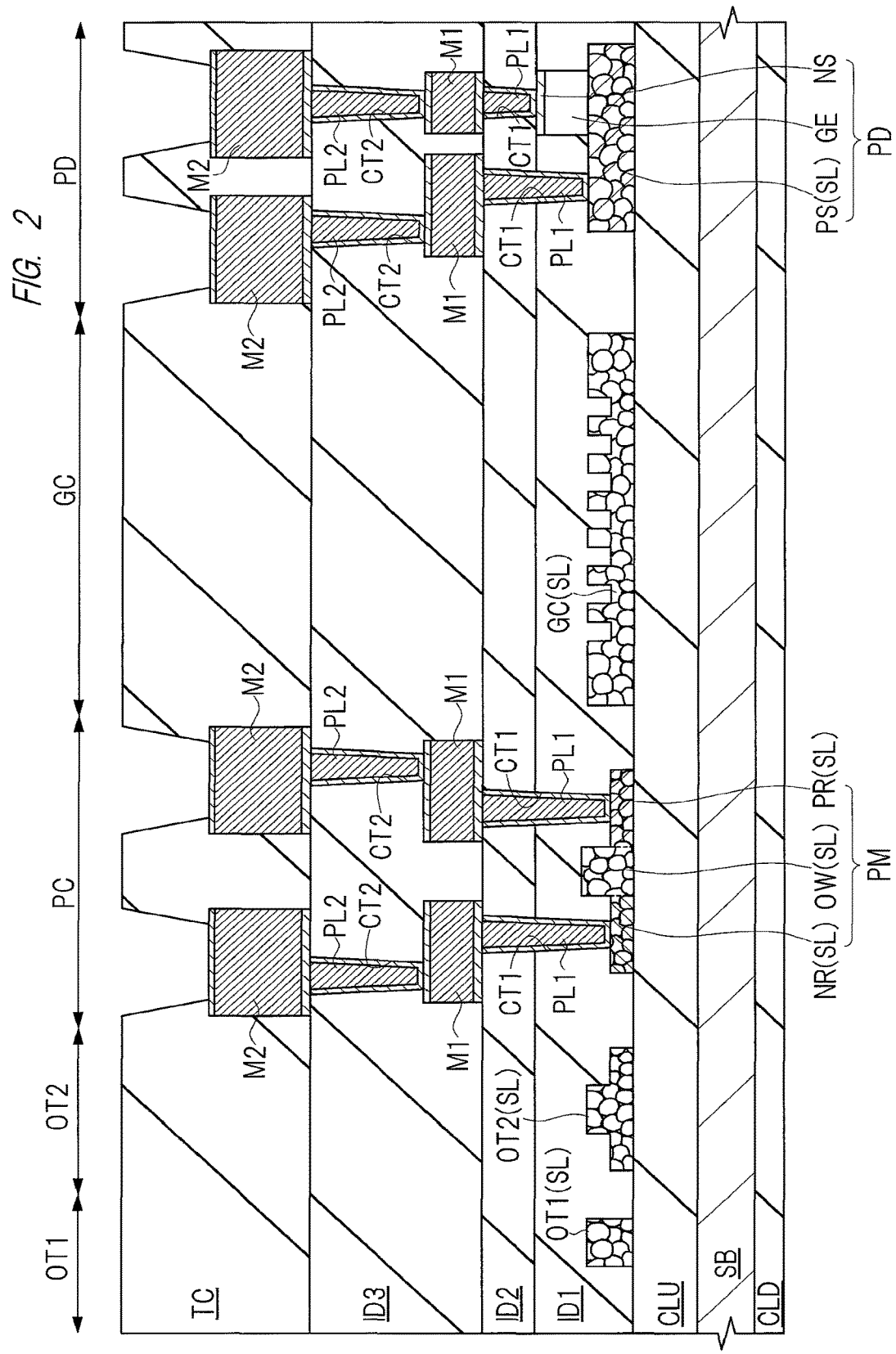
FIG. 2 is a main part cross-sectional view illustrating a first optical signal line, a second optical signal line, a grating coupler, a phase modulating part of an optical modulator, and a germanium optical receiver according to the first embodiment.
Figure 3:
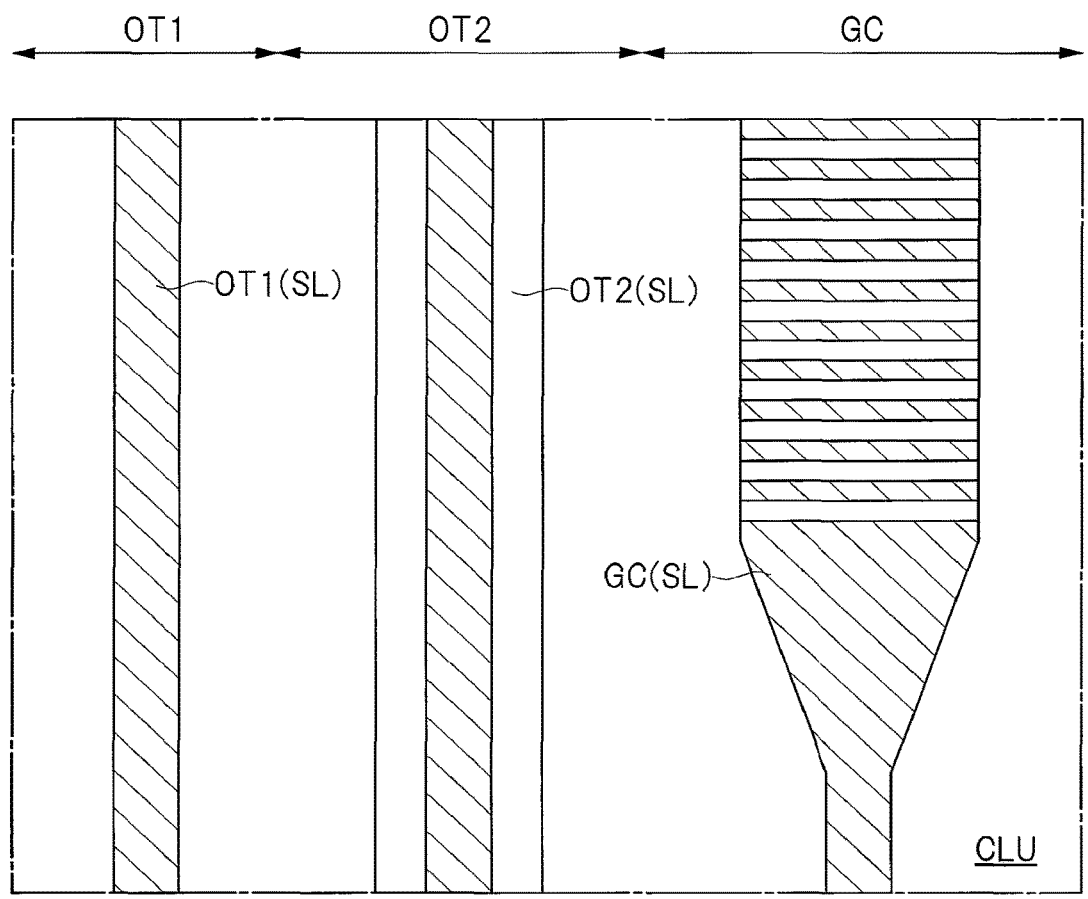
FIG. 3 is a main part top view illustrating the first optical signal line, the second optical signal line, and the grating coupler according to the first embodiment.
Figure 4:
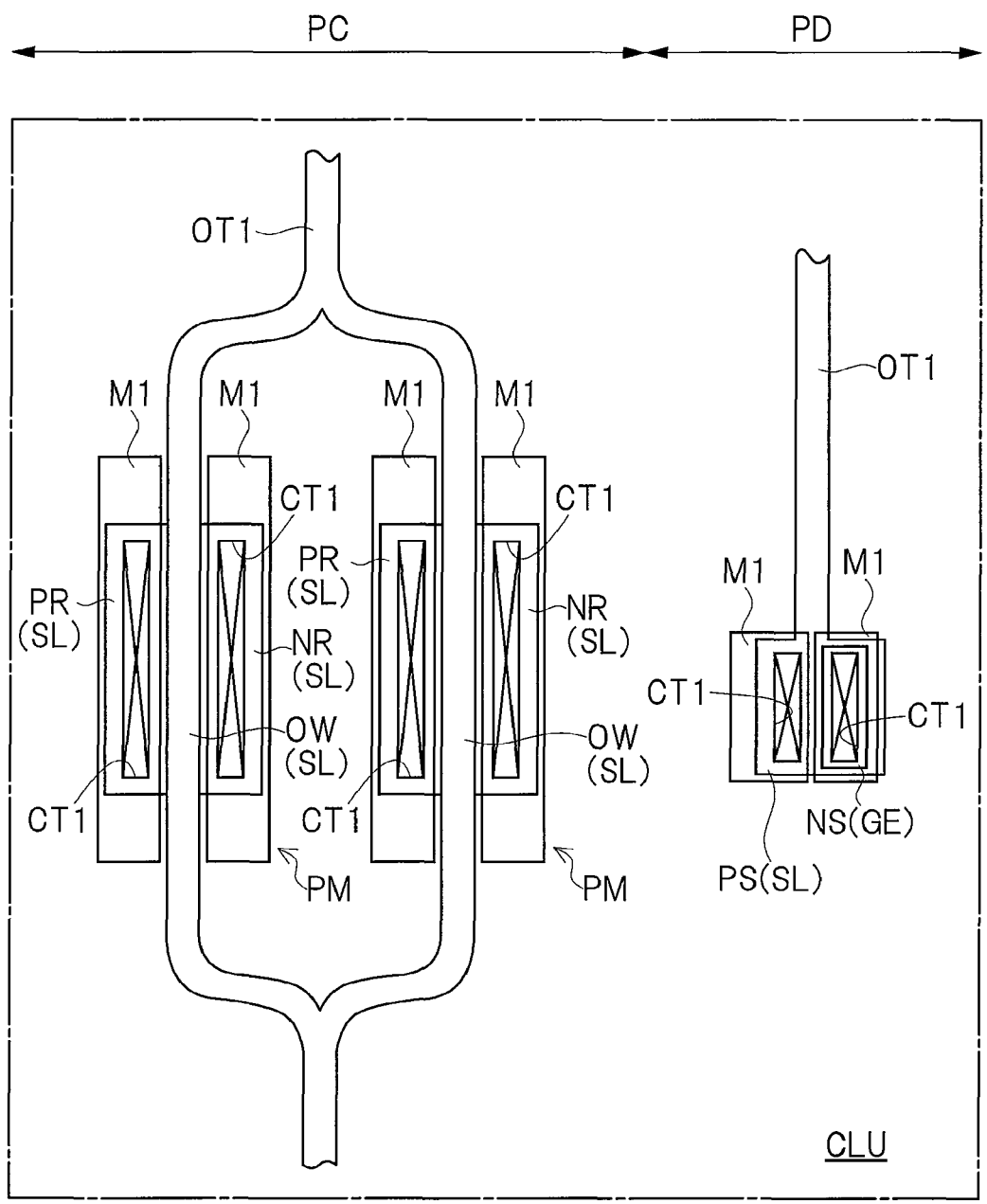
FIG. 4 is a main part top view illustrating the optical modulator and the germanium optical receiver according to the first embodiment.

Structures of various optical devices according to the first embodiment will be described with reference to FIGS. 2, 3, and 4. FIG. 2 is a main part cross-sectional view illustrating a first optical signal line, a second optical signal line, a grating coupler, a phase modulating part of an optical modulator, and a germanium optical receiver according to the first embodiment. FIG. 3 is a main part top view illustrating the first optical signal line, the second optical signal line, and the grating coupler according to the first embodiment. FIG. 4 is a main part top view illustrating the optical modulator and the germanium optical receiver according to the first embodiment.

Optical signal lines have various structures, but the first embodiment exemplifies a first optical signal line OT1 whose cross-section orthogonal to an optical waveguide direction has a quadrangular shape, and a second optical signal line OT2 whose cross-section orthogonal to the optical waveguide direction has a protruding shape. The first optical signal line OT1, the second optical signal line OT2, and an optical modulator PC are illustrated as the cross-sections orthogonal to the optical waveguide direction, and a grating coupler GC is illustrated as the cross-section in the optical waveguide direction. Note that in FIG. 2, a semiconductor layer SL made of a polycrystalline silicon film is enlarged in a thickness direction (a direction perpendicular to a first main surface of a semiconductor substrate SB) in order to clarify characteristics of the polycrystalline silicon film that constitutes the optical waveguide.

As illustrated in FIG. 2, the first optical signal line OT1, the second optical signal line OT2, the grating coupler GC, the optical modulator PC, and a p-type layer PS of a germanium optical receiver PD are formed by the semiconductor layer SL made of a polycrystalline silicon film. The semiconductor layer SL is formed on the first main surface of the semiconductor substrate SB made of monocrystalline silicon (Si) with an insulating layer (also referred to as a BOX layer or a lower clad layer) CLU interposed therebetween. The thickness of the insulating layer CLU is relatively large, for example, approximately 2 µm to 3 µm. This allows electrostatic capacitance between the semiconductor substrate SB and the semiconductor layer SL to be kept low. An insulating layer CLD is formed on a second main surface opposite to the first main surface of the semiconductor substrate SB.

The semiconductor layer SL is formed by a polycrystalline silicon film. However, surface morphology on an upper surface and side surfaces of the semiconductor layer SL is small, and crystal grains of polycrystalline silicon exposed on the upper surface of the semiconductor layer SL include crystal grains having flat surfaces parallel to the first main surface of the semiconductor substrate SB, and crystal grains of polycrystalline silicon exposed on the side surfaces (including side surfaces of a protrusion of a protruding portion) of the semiconductor layer SL include crystal grains having flat surfaces perpendicular to the first main surface of the semiconductor substrate SB. It is desirable that the crystal grains of polycrystalline silicon exposed on the side surfaces of the semiconductor layer SL be ones having flat surfaces perpendicular to the first main surface of the semiconductor substrate SB, but also include crystal grains having flat surfaces that have, for example, approximately 0 to 5 degrees with respect to the direction perpendicular to the first main surface of the semiconductor substrate SB.

Even though the crystal grains of polycrystalline silicon are made large, the surface morphology of the semiconductor layer SL is small. It is therefore possible to achieve good optical properties in various optical devices.

Structures of the first optical signal line OT1, the second optical signal line OT2, the grating coupler GC, the optical modulator PC, and the germanium optical receiver PD are described below.

<Optical Signal Lines>

As illustrated in FIGS. 2 and 3, the first optical signal line OT1 is formed by the semiconductor layer SL made of the polycrystalline silicon film and the cross-section thereof orthogonal to the optical waveguide direction has a quadrangular shape. The height of the first optical signal line OT1 is, for example, approximately 100 nm to 400 nm, and 250 nm can be exemplified as a representative value. The width of the first optical signal line OT1 in the cross-section orthogonal to the optical waveguide direction is, for example, approximately 100 nm to 500 nm, and 450 nm can be exemplified as a representative value.

The second optical signal line OT2 is formed by the semiconductor layer SL made of the polycrystalline silicon film, and has a rib structure. The cross-section of the second optical signal line OT2 that is orthogonal to the optical waveguide direction has a protruding shape, and the second optical signal line OT2 has a protruding portion. That is, the second optical signal line OT2 has a protruding portion extending in the optical waveguide direction, and slab portions formed on both sides of the protruding portion so as to be integral with the protruding portion.

The height of the protruding portion of the second optical signal line OT2 is the same as that of the first optical signal line OT1, and the height of a protrusion of the protruding portion of the second optical signal line OT2 is, for example, approximately 50 nm to 200 nm. The width of the protruding portion of the second optical signal line OT2 in the cross-section orthogonal to the optical waveguide direction is, for example, approximately 100 nm to 500 nm, and 450 nm can be exemplified as a representative value. The width of the slab portions of the second optical signal line OT2 in the cross-section orthogonal to the optical waveguide direction is, for example, approximately 100 nm to 10,000 nm, and 500 nm can be exemplified as a representative value. Note that the dimensions etc. described above are merely examples, and the present embodiment is not limited to these ones described above.

As described above, the semiconductor layer SL that constitutes the first optical signal line OT1 and the second optical signal line OT2 is formed by a polycrystalline silicon film. However, surface morphology on the upper surface and side surfaces (including side surfaces of the protrusion of the protruding portion) of the semiconductor layer SL is small, and crystal grains of polycrystalline silicon exposed on the upper surface of the semiconductor layer SL include crystal grains having flat surfaces parallel to the first main surface of the semiconductor substrate SB, and crystal grains of polycrystalline silicon exposed on the side surfaces of the semiconductor layer SL include crystal grains having flat surfaces perpendicular to the first main surface of the semiconductor substrate SB.

The first optical signal line OT1 and the second optical signal line OT2 are covered with a first interlayer insulating film (also referred to as an upper clad layer) ID1. Furthermore, a second interlayer insulating film ID2 is formed on the first interlayer insulating film ID1, a third interlayer insulating film ID3 is formed on the second interlayer insulating film ID2, and a protection film TC is formed on the third interlayer insulating film ID3. The first interlayer insulating film ID1, the second interlayer insulating film ID2, and the third interlayer insulating film ID3 are, for example, made of silicon oxide ($SiO_2$). The protection film TC is, for example, made of silicon oxide ($SiO_2$), silicon oxynitride (SiON), PSG (Phospho Silicate Glass), or silicon nitride ($Si_3N_4$). A wiring M1 of a first layer and a wiring M2 of a second layer that will be described later are not formed above the first optical signal line OT1 and the second optical signal line OT2.

<Grating Coupler>

As illustrated in FIGS. 2 and 3, the grating coupler GC is formed by the semiconductor layer SL made of the polycrystalline silicon film, and has a rib structure. The cross-section of the grating coupler GC in the optical waveguide direction has a protruding shape, and the grating coupler GC has a plurality of protruding portions that are spaced apart from each other in the optical waveguide direction. That is, the grating coupler GC has a plurality of protruding portions that are spaced apart from each other in the optical waveguide direction and slab portions that are formed between adjacent protruding portions so as to be integral with the protruding portions.

The height of the protruding portions of the grating coupler GC is the same as that of the first optical signal line OT1, and the height of protrusions of the protruding portions of the grating coupler GC is the same as that of the protrusion of the protruding portion of the second optical signal line OT2. Note that the dimensions etc. described above are merely examples, and the present embodiment is not limited to these ones described above.

The grating coupler GC is an optical device that couples laser light that is incident from an outside with light propagating in an optical waveguide, and emits light propagating in the optical waveguide to an outside. Light propagating in the grating coupler GC is diffraction-radiated in a specific direction by periodical refractive-index modulation provided along a propagation direction on an optical waveguide surface.

As described above, the semiconductor layer SL that constitutes the grating coupler GC is formed by the polycrystalline silicon film. However, surface morphology on the upper surface and side surfaces (including side surfaces of the protrusions of the protruding portions) of the semiconductor layer SL is small, and crystal grains of polycrystalline silicon exposed on the upper surface of the semiconductor layer SL include crystal grains having flat surfaces parallel to the first main surface of the semiconductor substrate SB, and crystal grains of polycrystalline silicon exposed on the side surfaces of the semiconductor layer SL include crystal grains having flat surfaces perpendicular to the first main surface of the semiconductor substrate SB.

The grating coupler GC is covered with the first interlayer insulating film ID1. Furthermore, the second interlayer insulating film ID2 is formed on the first interlayer insulating film ID1, the third interlayer insulating film ID3 is formed on the second interlayer insulating film ID2, and the protection film TC is formed on the third interlayer insulating film ID3. The wiring M1 of the first layer and the wiring M2 of the second layer that will be described later are not formed above the grating coupler GC. The protection film TC is sometimes not formed above the grating coupler GC performing input and output of an optical signal from/to an outside.

<Optical Modulator>

As illustrated in FIGS. 2 and 4, the optical modulator PC is formed by the semiconductor layer SL made of the polycrystalline silicon film, and has a rib structure. The cross-section of the optical modulator PC that is orthogonal to the optical waveguide direction has a protruding shape, and the optical modulator PC has a protruding portion. That is, the optical modulator PC has a protruding portion extending in the optical waveguide direction, and slab portions that are formed on both sides of the protruding portion so as to be integral with the protruding portion, as with the second optical signal line OT2.

The height of the protruding portion of the optical modulator PC is the same as that of the first optical signal line OT1, and the height of a protrusion of the protruding portion of the optical modulator PC is the same as that of the protrusion of the protruding portion of the second optical signal line OT2. The protruding portion is a core layer OW in which light propagates. The core layer OW is, for example, formed by a pure semiconductor, i.e., an i-type (intrinsic) semiconductor. Note that the dimensions etc. described above are merely examples, and the present embodiment is not limited to these ones described above.

In a phase modulating part PM of the optical modulator PC, p-type impurities are introduced into the semiconductor layer SL that constitutes the slab portion on one side of the core layer OW (the right side in FIG. 2) so as to form a p-type semiconductor PR. The p-type semiconductor PR is formed in parallel with the core layer OW. Furthermore, n-type impurities are introduced into the semiconductor layer SL that constitutes the slab portion on the other side of the core layer OW (the left side in FIG. 2) to form an n-type semiconductor NR. The n-type semiconductor NR is formed in parallel with the core layer OW. That is, the semiconductor layer SL between the p-type semiconductor PR and the n-type semiconductor NR is the i-type core layer OW, and a pin structure is thus formed.

Light (e.g., continuous wave laser light) that is incident from an input unit is separated into two optical waveguides by a branching unit, and the phase is manipulated in each phase modulating part PM. In the phase modulating part PM, carrier density in the core layer OW including the pure semiconductor changes due to application of a voltage to the p-type semiconductor PR and the n-type semiconductor NR, and a refractive index in the region changes accordingly. This changes an effective refractive index for light propagating in the optical modulator PC, thereby making it possible to change the phase of light output from the optical modulator PC.

As described above, the semiconductor layer SL that constitutes the optical modulator PC is formed by the polycrystalline silicon film. However, surface morphology on the upper surface and side surfaces (including side surfaces of the protrusion of the protruding portion) of the semiconductor layer SL is small, and crystal grains of polycrystalline silicon exposed on the upper surface of the semiconductor layer SL include crystal grains having flat surfaces parallel to the first main surface of the semiconductor substrate SB, and crystal grains of polycrystalline silicon exposed on the side surfaces of the semiconductor layer SL include crystal grains having flat surfaces perpendicular to the first main surface of the semiconductor substrate SB.

The optical modulator PC is covered with the first interlayer insulating film ID1. Furthermore, the second interlayer insulating film ID2 is formed on the first interlayer insulating film ID1. The first interlayer insulating film ID1 and the second interlayer insulating film ID2 are, for example, made of silicon oxide ($SiO_2$), and the total thickness thereof is, for example, approximately 2 µm to 3 µm.

The wiring M1 of the first layer is formed on the second interlayer insulating film ID2. The wiring M1 of the first layer is constituted of, for example, a main conductive material made of aluminum (Al) or copper (Cu), and barrier metal formed on lower and upper surfaces of the main conductive material. The barrier metal is provided, for example, for the purpose of preventing diffusion of metal of the main conductive material that constitutes the wiring M1 of the first layer, and is, for example, made of tantalum (Ta), titanium (Ti), tantalum nitride (TaN), or titanium nitride (TiN). The thickness of the barrier metal is, for example, approximately 5 nm to 20 nm.

First connection holes (also referred to as contact holes) CT1 that reach the p-type semiconductor PR and the n-type semiconductor NR, respectively, are formed in the first interlayer insulating film ID1 and the second interlayer insulating film ID2. In each of the first connection holes CT1, a first plug (also referred to as an embedded electrode or an embedded contact) PL1 whose main conductive material is tungsten (W) used in combination with barrier metal is formed. The barrier metal is provided, for example, for the purpose of preventing diffusion of the metal of the main conductive material that constitutes the first plug PL1, and is, for example, made of titanium (Ti) or titanium nitride (TiN). The thickness of the barrier metal is, for example, approximately 5 nm to 20 nm. The p-type semiconductor PR and the wiring M1 of the first layer are electrically connected to each other via the first plug PL1, and the n-type semiconductor NR and the wiring M1 of the first layer are electrically connected to each other also via the first plug PL1.

The wiring M1 of the first layer is covered with the third interlayer insulating film ID3. The third interlayer insulating film ID3 is, for example, made of silicon oxide ($SiO_2$), and the thickness thereof is, for example, 1 µm or more.

The wiring M2 of the second layer is formed on the third interlayer insulating film ID3. The wiring M2 of the second layer is constituted of, for example, a main conductive material made of aluminum (Al) or copper (Cu), and barrier metal formed on lower and upper surfaces of the main conductive material, as with the wiring M1 of the first layer. The barrier metal is provided, for example, for the purpose of preventing diffusion of the metal of the main conductive material that constitutes the wiring M2 of the second layer, and is, for example, made of tantalum (Ta), titanium (Ti), tantalum nitride (TaN), or titanium nitride (TiN). The thickness of the barrier metal is, for example, approximately 5 nm to 20 nm.

Second connection holes (also referred to as via holes) CT2 that reach the wiring M1 of the first layer are formed in the third interlayer insulating film ID3. In each of the second connection holes CT2, a second plug (also referred to as an embedded electrode or an embedded contact) PL2 whose main conductive material is tungsten (W) used in combination with barrier metal is formed. The barrier metal is provided, for example, for the purpose of preventing diffusion of the metal of the main conductive material that constitutes the second plug PL2, and is, for example, made of titanium (Ti) or titanium nitride (TiN), as with the first plug PL1. The thickness of the barrier metal is, for example, approximately 5 nm to 20 nm. The wiring M1 of the first layer and the wiring M2 of the second layer are electrically connected to each other via the second plug PL2.

The wiring M2 of the second layer is covered with the protection film TC, and a part of the protection film TC is opened, so that an upper surface of the wiring M2 of the second layer is exposed.

<Germanium Optical Receiver>

As illustrated in FIGS. 2 and 4, the germanium optical receiver PD has, for example, a vertical pin structure, and is constituted of a p-type layer PS obtained by introducing p-type impurities into the semiconductor layer SL made of the polycrystalline silicon film, a germanium layer GE formed on the p-type layer PS, and an n-type layer NS formed on the germanium layer GE. The n-type layer NS is, for example, made of silicon germanium (SiGe) and the n-type impurities are introduced thereinto. In the first embodiment, the p-type layer PS is formed by the semiconductor layer SL made of the polycrystalline silicon film. However, the germanium optical receiver PD may be constituted such that the n-type layer NS is formed by the semiconductor layer SL made of the polycrystalline silicon film, the germanium layer GE is formed on the n-type layer NS, and the p-type layer PS is formed on the germanium layer GE.

Since germanium (Ge) and silicon (Si) have a high affinity for each other, the germanium layer GE can be monolithically formed on the semiconductor layer SL made of the polycrystalline silicon film in the germanium optical receiver PD.

As described above, the semiconductor layer SL that constitutes the p-type layer PS of the germanium optical receiver PD is formed by the polycrystalline silicon film. However, surface morphology on the upper surface and side surfaces of the semiconductor layer SL is small, and crystal grains of polycrystalline silicon exposed on the upper surface of the semiconductor layer SL include crystal grains having flat surfaces parallel to the first main surface of the semiconductor substrate SB, and crystal grains of polycrystalline silicon exposed on the side surfaces of the semiconductor layer SL include crystal grains having flat surfaces perpendicular to the first main surface of the semiconductor substrate SB.

The germanium optical receiver PD is covered with the first interlayer insulating film ID1. Furthermore, the second interlayer insulating film ID2 is formed on the first interlayer insulating film ID1.

The wiring M1 of the first layer is formed on the second interlayer insulating film ID2. Furthermore, the first connection hole CT1 that reaches the p-type layer PS is formed in the first interlayer insulating film ID1 and the second interlayer insulating film ID2, and the first connection hole CT1 that reaches the n-type layer NS is formed in the second interlayer insulating film ID2. The first plug PL1 is formed in each of the first connection holes CT1. The p-type layer PS and the wiring M1 of the first layer are electrically connected to each other via the first plug PL1, and the n-type layer NS and the wiring M1 of the first layer are electrically connected to each other via the first plug PL1.

The wiring M1 of the first layer is covered with the third interlayer insulating film ID3. Furthermore, the wiring M2 of the second layer is formed on the third interlayer insulating film ID3. The second connection holes CT2 that reach the wiring M1 of the first layer are formed in the third interlayer insulating film ID3. The second plug PL2 is formed in each of the second connection holes CT2. The wiring M1 of the first layer and the wiring M2 of the second layer are electrically connected to each other via the second plug PL2.

The wiring M2 of the second layer is covered with the protection film TC, and a part of the protection film TC is opened, so that an upper surface of the wiring M2 of the second layer is exposed.

<<Method for Manufacturing Optical Devices>>

A method for manufacturing the optical devices according to the first embodiment will be described in the order of steps with reference to FIGS. 5 through 13. FIGS. 5, and 7 through 13 are main part cross-sectional views of the optical devices in manufacturing steps according to the first embodiment. FIGS. 6A, 6B, 6C, and 6D are main part cross-sectional views for describing steps of forming an optical waveguide having a rib structure according to the first embodiment.

In the first embodiment, a method for manufacturing the first optical signal line OT1, the second optical signal line OT2, the grating coupler GC, the optical modulator PC, and the germanium optical receiver PD will be described. Full etching and half etching are used to process the semiconductor layer SL. The full etching is dry etching from the upper surface to the lower surface of the semiconductor layer SL, and the half etching is dry etching from the upper surface of the semiconductor layer SL while leaving a predetermined thickness thereof.

First, as illustrated in FIG. 5, a substrate (the substrate having a substantially circular shape in a plan view and called a wafer at this stage) which is constituted of the semiconductor substrate SB, the insulating layer CLU formed on the first main surface of the semiconductor substrate SB, and the insulating layer CLD formed on the second main surface opposite to the first main surface of the semiconductor substrate SB is prepared. The semiconductor substrate SB is a support substrate made of monocrystalline silicon, and the insulating layers CLD and CLU are made of silicon oxide ($SiO_2$). The thickness of the semiconductor substrate SB is, for example, approximately 750 μm. The thickness of the insulating layer CLU is, for example, approximately 2 μm to 3 μm.

Next, the semiconductor layer SL made of a polycrystalline silicon film is formed on the insulating layer CLU. The polycrystalline silicon film is, for example, formed by an LPCVD method using monosilane ($SiH_4$) gas, and a temperature during film formation is, for example, 600° C. to 650° C. The thickness of the polycrystalline silicon film is, for example, approximately 100 nm to 400 nm. In the present embodiment, the thickness of the polycrystalline silicon film is set to 250 nm as an example. Then, thermal treatment at a temperature higher than a growth temperature of the polycrystalline silicon film, for example, thermal treatment at approximately 950° C. for approximately 10 minutes is performed, so that polycrystalline silicon grains are not enlarged by thermal treatment to be performed in a later step.

Figure 6A:
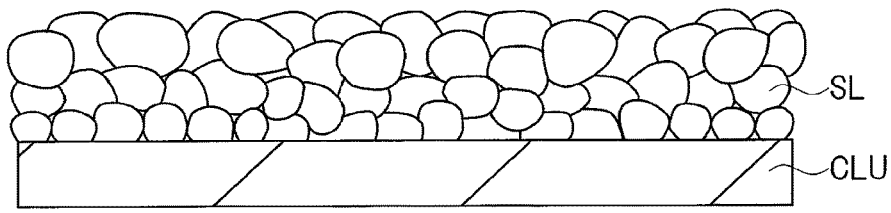

As illustrated in FIG. 6A, the semiconductor layer SL is formed by the polycrystalline silicon film that has been subjected to the thermal treatment. Since polycrystalline silicon having a relatively large crystal grain diameter (e.g., approximately 50 nm to 150 nm), surface morphology on the upper surface and the side surfaces of the semiconductor layer SL is large.

Figure 6B:
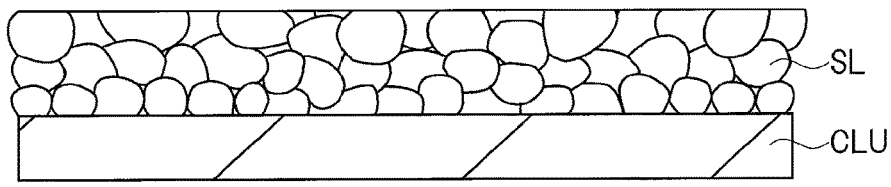

Next, as illustrated in FIGS. 6B and 7, the upper surface of the semiconductor layer SL is planarized by grinding the upper surface of the semiconductor layer SL, using a method such as a chemical mechanical polishing (CMP) method. This grinds surfaces of crystal grains of polycrystalline silicon exposed on the upper surface of the semiconductor layer SL, so that the surfaces of the crystal grains of polycrystalline silicon are processed into flat surfaces parallel to the first main surface of the semiconductor substrate SB. Accordingly, surface morphology on the upper surface of the semiconductor layer SL becomes small.

Figure 6C:
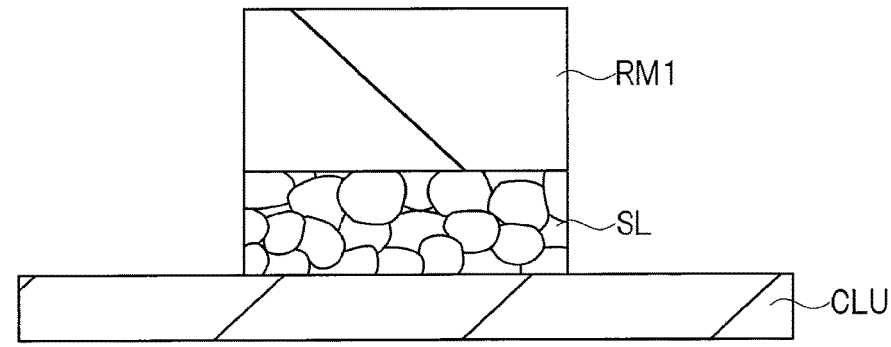

Next, as illustrated in FIGS. 6C and 8, a first resist mask RM1 used to process the semiconductor layer SL is formed. Although a single-layer resist mask is exemplified in FIGS. 6C and 8, a multilayer resist mask may be also used. The first resist mask RM1 is, for example, formed by applying a photoresist onto the upper surface of the semiconductor layer SL, performing immersion exposure using ArF excimer laser (wavelength 193 nm), performing development, and then patterning the photoresist.

Next, the semiconductor layer SL is processed by full etching with use of the first resist mask RM1 as an etching mask. This processes surfaces of the crystal grains of polycrystalline silicon exposed on the side surfaces of the semiconductor layer SL into flat surfaces perpendicular to the first main surface of the semiconductor substrate SB. Accordingly, surface morphology on the side surfaces of the semiconductor layer SL becomes small. The perpendicular flat surfaces encompass a flat surface that has an angle of, for example, 0 to 5 degrees with respect to a direction perpendicular to the first main surface of the semiconductor substrate SB.

Next, the first resist mask RM1 is removed by oxygen ($O_2$) plasma ashing, and RCA cleaning further is performed. Then, wet etching is performed to remove a natural oxide film and the like formed on the surface and the like of the semiconductor layer SL. Since the surface morphology on the upper surface of the semiconductor layer SL on which the first resist mask RM1 is formed is small, no peeling residue of the photoresist remains even when the first resist mask RM1 is peeled off. It is therefore possible to prevent surface scattering (see FIG. 24) caused by a residue of an organic substance.

Figure 6D:
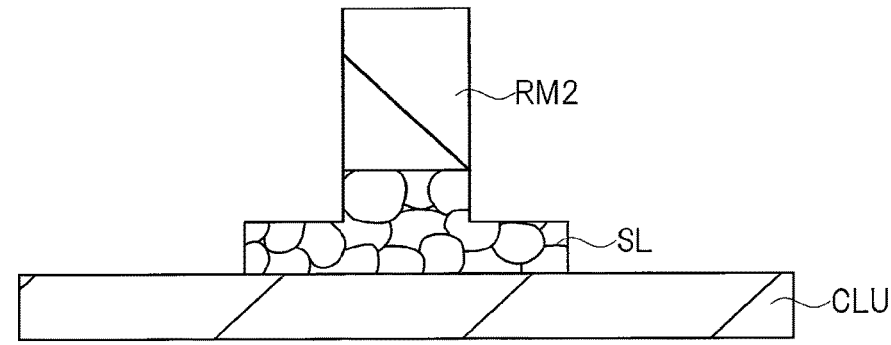

Next, as illustrated in FIGS. 6D and 9, a second resist mask RM2 used to process the semiconductor layer SL into a rib structure is formed. Although a single-layer resist mask is exemplified in FIGS. 6D and 9, a multilayer resist mask may be also used. The second resist mask RM2 is, for example, formed by applying a photoresist onto the upper surface of the semiconductor layer SL, performing immersion exposure using ArF excimer laser (wavelength 193 nm), performing development, and then patterning the photoresist.

Next, the semiconductor layer SL having a rib structure is formed by processing the semiconductor layer SL by half etching with use of the second resist mask RM2 as an etching mask. This processes surfaces of crystal grains of polycrystalline silicon exposed on the side surfaces of a protrusion of a protruding portion of the semiconductor layer SL into flat surfaces perpendicular to the first main surface of the semiconductor substrate SB. Accordingly, surface morphology on the side surfaces of the protrusion of the protruding portion of the semiconductor layer SL becomes small. The perpendicular flat surfaces encompass flat surfaces having an angle of, for example, 0 to 5 degrees with respect to a direction perpendicular to the first main surface of the semiconductor substrate SB. Since surface morphology on the upper surface of the semiconductor layer SL, not subjected to half etching, is reflected on upper surfaces of slab portions of the semiconductor layer SL, surface morphology on the upper surfaces of the slab portions of the semiconductor layer SL becomes small.

Next, the second resist mask RM2 is removed by oxygen ($O_2$) plasma ashing, and RCA cleaning is performed. Then, wet etching is performed to remove a natural oxide film and the like formed on the surface and the like of the semiconductor layer SL. Since the surface morphology on the upper surface of the semiconductor layer SL on which the second resist mask RM2 is formed is small, no peeling residue of the photoresist remains even when the second resist mask RM2 is peeled off. It is therefore possible to prevent surface scattering (see FIG. 24) caused by a residue of an organic substance.

Next, as illustrated in FIG. 10, in the phase modulating part PM of the optical modulator PC, the p-type semiconductor PR is formed by introducing p-type impurities into the semiconductor layer SL that constitutes a slab portion on one side of the protruding portion, for example, by ion implantation using a photoresist mask. Similarly, the n-type semiconductor NR is formed by introducing n-type impurities into the semiconductor layer SL that constitutes a slab portion on the other side of the protruding portion, for example, by ion implantation using a photoresist mask. The semiconductor layer SL including the protruding portion between the p-type semiconductor PR and the n-type semiconductor NR becomes the core layer OW including a pure semiconductor.

Furthermore, the p-type layer PS is formed by introducing p-type impurities such as boron (B) into the semiconductor layer SL of the germanium optical receiver PD, for example, by ion implantation using a photoresist mask.

Next, as illustrated in FIG. 11, the first interlayer insulating film ID1 is formed so as to cover the semiconductor layer SL of each of the first optical signal line OT1, the second optical signal line OT2, the grating coupler GC, the optical modulator PC, and the p-type layer PS of the germanium optical receiver PD. The first interlayer insulating film ID1 is made of silicon oxide ($SiO_2$) formed, for example, by a plasma CVD (Chemical Vapor Deposition) method, and the thickness thereof is, for example, approximately 1 μm. Then, the upper surface of the first interlayer insulating film ID1 is planarized, for example, by a CMP method.

Next, an opening in which a part of the upper surface of the p-type layer PS of the germanium optical receiver PD is exposed is formed in the first interlayer insulating film ID1, and then the non-doped germanium layer GE is selectively formed on the upper surface of the p-type layer PS exposed on a bottom of the opening. The germanium layer GE is formed, for example, by an epitaxial growth method using $GeH_4$ gas at a temperature of 600° C. The thickness of the germanium layer GE is, for example, approximately 300 nm to 20,000 nm.

Next, the n-type layer NS, made of silicon germanium (Site), into which n-type impurities such as phosphorus (P) is introduced is selectively formed on the upper surface of the germanium layer GE. The n-type layer NS is formed, for example, by an epitaxial growth method using $GeH_4$ gas to which $PH_3$ gas is added at a temperature of 600° C. The n-type layer NS may be formed by using $GeH_4$ gas to which $AsH_3$ gas is added instead of $PH_3$ gas. The thickness of the n-type layer NS is, for example, approximately 100 nm to 200 nm.

Next, as illustrated in FIG. 12, the second interlayer insulating film ID2 is formed so as to cover the first optical signal line OT1, the second optical signal line OT2, the grating coupler GC, the optical modulator PC, and the germanium optical receiver PD. The second interlayer insulating film ID2 is made of silicon oxide ($SiO_2$) formed, for example, by a plasma CVD method, and the thickness thereof is, for example, approximately 1 μm to 2 μm. Then, the upper surface of the second interlayer insulating film ID2 is planarized, for example, by a CMP method.

Next, the first connection holes CT1 that reach the p-type semiconductor PR and the n-type semiconductor NR of the optical modulator PC, respectively, are formed in the first interlayer insulating film ID1 and the second interlayer insulating film ID2. Concurrently, the first connection hole CT1 that reaches the p-type layer PS of the germanium optical receiver PD is formed in the first interlayer insulating film ID1 and the second interlayer insulating film ID2, and the first connection hole CT1 that reaches the n-type layer NS of the germanium optical receiver PD is formed in the second interlayer insulating film ID2. Then, the first connection holes CT1 are filled with a conductive film, and the first plug PL1 made of this conductive film is thus formed. The main conductive material of the first plug PL1 is, for example, tungsten (W).

Next, the wiring M1 of the first layer is formed by depositing a metal film whose main conductive material is, for example, aluminum (Al) on the second interlayer insulating film ID2, for example, by a sputtering method, and then by processing the metal film by a dry etching method with use of a resist mask.

Next, as illustrated in FIG. 13, the third interlayer insulating film ID3 is formed so as to cover the wiring M1 of the first layer. The third interlayer insulating film ID3 is made of silicon oxide (SiO$_2$) formed, for example, by a plasma CVD method, and the thickness thereof is, for example, not less than 1 μm. Then, the upper surface of the third interlayer insulating film ID3 is planarized, for example, by a CMP method.

Next, the second connection holes CT2 that reach the wiring M1 of the first layer are formed in the third interlayer insulating film ID3, and then the second connection holes CT2 are filled with a conductive film, and the second plug PL2 made of this conductive film is thus formed. The main conductive material of the second plug PL2 is, for example, tungsten (W).

Next, the wiring M2 of the second layer is formed by depositing a metal film whose main conductive material is, for example, aluminum (Al) on the third interlayer insulating film ID3, for example, by a sputtering method, and then by processing the metal film by a dry etching method with use of a resist mask.

Then, as illustrated in FIG. 2, the protection film TC is formed so as to cover the wiring M2 of the second layer. The protection film TC is, for example, made of silicon oxide (SiO$_2$), silicon oxynitride (SiON), or the like. Then, the upper surface of the wiring M2 of the second layer is exposed by processing the protection film TC. This substantially completes the semiconductor device according to the first embodiment.

As described above, according to the first embodiment, surface morphology on an upper surface and side surfaces of an optical waveguide can be made small even in a case where the optical waveguide is made of a polycrystalline silicon film. Furthermore, even in a case where the optical waveguide has a rib structure, surface morphology on an upper surface of a protruding portion, on side surfaces of a protrusion of the protruding portion, and on upper surfaces and side surfaces of slab portions can be made small. This makes it possible to reduce grain scattering and surface scattering. It is therefore possible to achieve good optical properties in the optical waveguide made of a polycrystalline silicon film.

(Second Embodiment)
<<Structures of Optical Devices>>

Structures of various optical devices according to the second embodiment will be described with reference to FIG. 14. FIG. 14 is a main part cross-sectional view illustrating optical devices according to the second embodiment, and illustrates main part cross-sections of a first optical signal line constituted of an optical waveguide whose cross-section orthogonal to an optical waveguide direction has a quadrangular shape, a second optical signal line constituted of an optical waveguide whose cross-section orthogonal to the optical waveguide direction has a protruding shape, a grating coupler, a phase modulating part of an optical modulator, and a germanium optical receiver.

A difference from the first embodiment lies in a method for forming a polycrystalline silicon film that forms a semiconductor layer SL. In the first embodiment, a polycrystalline silicon film is directly formed on the insulating layer CLU, for example, by an LPCVD method, and then a polycrystalline silicon film having a large crystal grain diameter is formed by performing thermal treatment at a temperature higher than a growth temperature of the polycrystalline silicon film. Meanwhile, in the second embodiment, an amorphous silicon film is formed on an insulating layer CLU, and then a polycrystalline silicon film having a uniform crystal grain diameter is formed by the amorphous silicon film by performing thermal treatment at a high temperature.

<<Method for Manufacturing Optical Devices>>

A method for manufacturing the optical devices according to the second embodiment will be described with reference to FIGS. 15 and 16. FIGS. 15A, 15B, 15C, and 15D are main part cross-sectional views for describing steps of forming an optical waveguide having a rib structure according to the second embodiment. FIGS. 16E, 16F, and 16G are main part cross-sectional views for describing steps, following the steps in FIG. 15, of forming the optical waveguide having a rib structure according to the second embodiment. In the second embodiment, steps of forming the semiconductor layer SL are described, and steps other than the steps of forming the semiconductor layer SL are similar to those in the first embodiment, and therefore the description thereof is omitted.

As illustrated in FIG. 15A, an amorphous silicon film is formed on the insulating layer CLU. The amorphous silicon film is formed, for example, by an LPCVD method using monosilane (SiH$_4$) gas, and a temperature during film formation is, for example, 400° C. to 450° C. The thickness of the amorphous silicon film is, for example, approximately 100 nm to 400 nm. In the second embodiment, the thickness of the amorphous silicon film is set to 250 nm as an example.

Next, as illustrated in FIG. 15B, a semiconductor layer SL made of a polycrystalline silicon film is formed by crystallizing the amorphous silicon film, for example, through thermal treatment on the amorphous silicon film at 950° C. for approximately 10 minutes. Since the polycrystalline silicon film is formed by the amorphous silicon film, a polycrystalline silicon film in which crystal grains have a smaller and more uniform diameter than a polycrystalline silicon film that is directly formed, for example, by an LPCVD method can be obtained. However, even in this case, since polycrystalline silicon having a relatively large crystal grain diameter is formed (e.g., approximately 30 nm to 100 nm), surface morphology of the polycrystalline silicon film is relatively large, and therefore surface scattering is more likely to occur although grain scattering is unlikely to occur.

Next, as illustrated in FIG. 15C, an upper surface of the semiconductor layer SL is planarized by grinding the upper surface of the semiconductor layer SL, for example, by a CMP method. This grinds surfaces of crystal grains of polycrystalline silicon exposed on the upper surface of the semiconductor layer SL into flat surfaces parallel to a first main surface of a semiconductor substrate SB. Accordingly, surface morphology on the upper surface of the semiconductor layer SL becomes small.

Next, as illustrated in FIG. 15D, a first resist mask RM1 used to process the semiconductor layer SL is formed. Although a single-layer resist mask is exemplified in FIG. 15D, a multilayer resist mask may also be used.

Next, as illustrated in FIG. 16E, the semiconductor layer SL is processed by full etching with use of the first resist mask RM1 as an etching mask. This processes surfaces of crystal grains of polycrystalline silicon exposed on side surfaces of the semiconductor layer SL into flat surfaces perpendicular to the first main surface of the semiconductor substrate SB. Accordingly, surface morphology on the side surfaces of the semiconductor layer SL becomes small. The perpendicular flat surfaces encompass a flat surface having an angle of, for example, approximately 0 to 5 degrees with respect to a direction perpendicular to the first main surface of the semiconductor substrate SB.

Next, the first resist mask RM1 is removed by oxygen ($O_2$) plasma ashing, and RCA cleaning is further performed. Then, wet etching is performed to remove a natural oxide film and the like formed on the surface and the like of the semiconductor layer SL. Since the surface morphology on the upper surface of the semiconductor layer SL on which the first resist mask RM1 is formed is small, no peeling residue of the photoresist remains even when the first resist mask RM1 is peeled off. It is therefore possible to prevent surface scattering (see FIG. 24) caused by a residue of an organic substance.

Next, as illustrated in FIG. 16F, a second resist mask RM2 used to process the semiconductor layer SL into a rib structure is formed. Although a single-layer resist mask is exemplified in FIG. 16F, a multilayer resist mask may also be used.

Next, as illustrated in FIG. 16G, the semiconductor layer SL having a rib structure is formed by processing the semiconductor layer SL by half etching with use of the second resist mask RM2 as an etching mask. This processes surfaces of crystal grains of polycrystalline silicon exposed on side surfaces of a protrusion of a protruding portion of the semiconductor layer SL into flat surfaces perpendicular to the first main surface of the semiconductor substrate SB. Accordingly, surface morphology on the side surfaces of the protrusion of the protruding portion of the semiconductor layer SL becomes small. The perpendicular flat surfaces encompass a flat surface having an angle of, for example, 0 to 5 degrees with respect to a direction perpendicular to the first main surface of the semiconductor substrate SB. Since surface morphology on the upper surface of the semiconductor layer SL, not subjected to half etching, is reflected on upper surfaces of slab portions of the semiconductor layer SL, surface morphology on the upper surfaces of the slab portions of the semiconductor layer SL becomes small.

Next, the second resist mask RM2 is removed by oxygen ($O_2$) plasma ashing, and RCA cleaning is further performed. Then, wet etching is performed to remove a natural oxide film and the like formed on the surface and the like of the semiconductor layer SL. Since the surface morphology on the upper surface of the semiconductor layer SL on which the second resist mask RM2 is formed is small, no peeling residue of the photoresist remains even when the second resist mask RM2 is peeled off. It is therefore possible to prevent surface scattering (see FIG. 24) caused by a residue of an organic substance.

As described above, according to the second embodiment, even in a case where an optical waveguide made of a polycrystalline silicon film is formed by forming an amorphous silicon film and then performing thermal treatment on the amorphous silicon film, surface morphology on an upper surface and side surfaces of the optical waveguide can be made small. Furthermore, even in a case where the optical waveguide has a rib structure, surface morphology on an upper surface of a protruding portion, on side surfaces of a protrusion of the protruding portion, and on upper surfaces and side surfaces of slab portions can be made small. This makes it possible to obtain effects almost similar to those in the first embodiment.

(Third Embodiment)

<<Structures of Optical Devices>>

Structures of various optical devices according to the third embodiment will be described with reference to FIGS. 17 and 18. FIG. 17 is a main part cross-sectional view illustrating optical devices according to the third embodiment, and illustrates main part cross-sections of a first optical signal line constituted of an optical waveguide whose cross-section orthogonal to an optical waveguide direction has a quadrangular shape, a second optical signal line constituted of an optical waveguide whose cross-section orthogonal to the optical waveguide direction has a protruding shape, a third optical signal line constituted of an optical waveguide whose cross-section orthogonal to the optical waveguide direction has a quadrangular shape, a grating coupler, a phase modulating part of an optical modulator, and a germanium optical receiver. FIG. 18 is a main part top view illustrating the first optical signal line, the second optical signal line, the third optical signal line, and the grating coupler.

A difference from the first embodiment is that an optical waveguide made of a polycrystalline silicon film has a multilayer structure. In the third embodiment, a third optical signal line OT3 is formed above a second optical signal line OT2, that is to say, an optical waveguide has a two-layer structure. In the third embodiment, the third optical signal line OT3 is formed above the second optical signal line OT2. However, the embodiment is not limited to to this structure. For example, the third optical signal line OT3 may be formed above a first optical signal line OT1.

As illustrated in FIG. 17, the first optical signal line OT1, the second optical signal line OT2, a grating coupler GC, an optical modulator PC, and a p-type layer PS of a germanium optical receiver PD are constituted of a first semiconductor layer SL1 made of a polycrystalline silicon film, as with the semiconductor layer SL described in the first embodiment.

The first semiconductor layer SL1 is formed by a polycrystalline silicon film. However, surface morphology on an upper surface and side surfaces of the first semiconductor layer SL1 is small, and crystal grains of polycrystalline silicon exposed on the upper surface of the first semiconductor layer SL1 include crystal grains having flat surfaces parallel to the first main surface of the semiconductor substrate SB, and crystal grains of polycrystalline silicon exposed on the side surfaces (including side surface of a protrusion of a protruding portion) of the first semiconductor layer SL1 include crystal grains having flat surfaces perpendicular to the first main surface of the semiconductor substrate SB.

Since surface morphology of the first semiconductor layer SL1 is small even in a case where crystal grains of polycrystalline silicon are made large, it is possible to achieve good optical properties in various optical devices.

Furthermore, as illustrated in FIGS. 17 and 18, the third optical signal line OT3 is, for example, formed on a first interlayer insulating film ID1 which covers the first semiconductor layer SL1, and the third optical signal line OT3 is constituted of a second semiconductor layer SL2 made of a polycrystalline silicon film.

The second semiconductor layer SL2 is formed by a polycrystalline silicon film. However, surface morphology on an upper surface and side surfaces of the second semiconductor layer SL2 is small, and crystal grains of polycrystalline silicon exposed on the upper surface of the second semiconductor layer SL2 include crystal grains having flat surfaces parallel to the first main surface of the semiconductor substrate SB, and crystal grains of polycrystalline silicon exposed on the side surfaces of the second semiconductor layer SL2 include crystal grains having flat surfaces perpendicular to the first main surface of the semiconductor substrate SB.

<<Method for Manufacturing Optical Devices>>

A method for manufacturing the optical devices according to the third embodiment will be described in the order of steps with reference to FIGS. 19 through 21. FIGS. 19 through 21 are main part cross-sectional views of optical devices in manufacturing steps according to the third embodiment. In the following description, steps of manufacturing the third optical signal line OT3 are mainly described. The manufacturing processes (the manufacturing steps described with reference to FIGS. 3 through 10) for forming the first semiconductor layer SL1 of each of the first optical signal line OT1, the second optical signal line OT2, the grating coupler GC, the optical modulator PC, and the p-type layer PS of the germanium optical receiver PD on the insulating layer CLU are similar to those in the first embodiment, and therefore the description thereof is omitted.

As illustrated in FIG. 19, the first interlayer insulating film ID1 is formed so as to cover the first semiconductor layer SL1 of each of the first optical signal line OT1, the second optical signal line OT2, the grating coupler GC, the optical modulator PC, and the p-type layer PS of the germanium optical receiver PD formed on the insulating layer CLU, as in the first embodiment. The first interlayer insulating film ID1 is made of silicon oxide ($SiO_2$) formed, for example, by a plasma CVD method, and the thickness thereof is, for example, approximately 1 μm. Then, the upper surface of the first interlayer insulating film ID1 is planarized, for example, by a CMP method.

Next, the second semiconductor layer SL2 made of the polycrystalline silicon film is formed on the first interlayer insulating film ID1. The polycrystalline silicon film is formed, for example, by an LPCVD method using monosilane ($SiH_4$) gas, and a temperature during film formation is, for example, 600° C. to 650° C. The thickness of the polycrystalline silicon film is, for example, approximately 100 nm to 400 nm. In the present embodiment, the thickness of the polycrystalline silicon film is set to 250 nm as an example. Then, for example, thermal treatment at approximately 950° C. for approximately 10 minutes is performed, so that polycrystalline silicon grains are not enlarged by thermal treatment to be performed in a later step.

The second semiconductor layer SL2 is formed by a polycrystalline silicon film. Since polycrystalline silicon having a relatively large crystal grain diameter is formed (e.g., approximately 50 nm to 150 nm), surface morphology on an upper surface and side surfaces of the second semiconductor layer SL2 becomes large.

Next, as illustrated in FIG. 20, the upper surface of the second semiconductor layer SL2 is planarized by grinding the upper surface of the second semiconductor layer SL2, for example, by a CMP method. This grinds surfaces of crystal grains of polycrystalline silicon exposed on the upper surface of the second semiconductor layer SL2 into flat surfaces parallel to the first main surface of the semiconductor substrate SB. Accordingly, surface morphology on the upper surface of the second semiconductor layer SL2 becomes small.

Next, a third resist mask RM3 used to process the second semiconductor layer SL2 is formed. The third resist mask RM3 is formed, for example, by applying a photoresist onto the upper surface of the second semiconductor layer SL2, performing immersion exposure using ArF excimer laser (wavelength 193 nm), performing development, and then patterning the photoresist.

Next, the second semiconductor layer SL2 is processed by full etching with use of the third resist mask RM3 as an etching mask. This processes surfaces of crystal grains of polycrystalline silicon exposed on the side surfaces of the second semiconductor layer SL2 into flat surfaces perpendicular to the first main surface of the semiconductor substrate SB. Accordingly, surface morphology on the side surfaces of the second semiconductor layer SL2 becomes small. The perpendicular planes encompass a flat surface having an angle of, for example, approximately 0 to 5 degrees with respect to a direction perpendicular to the first main surface of the semiconductor substrate SB.

Next, the third resist mask RM3 is removed by oxygen ($O_2$) plasma ashing, and RCA cleaning is further performed. Then, wet etching is performed to remove a natural oxide film and the like formed on the surface and the like of the second semiconductor layer SL2. Since the surface morphology on the upper surface of the second semiconductor layer SL2 on which the third resist mask RM3 is formed is small, no peeling residue of the photoresist remains even when the third resist mask RM3 is peeled off. It is therefore possible to prevent surface scattering caused by a residue of an organic substance.

Next, as illustrated in FIG. 21, a second interlayer insulating film ID2 is formed so as to cover the second semiconductor layer SL2 of the third optical signal line OT3.

Next, an opening in which a part of the upper surface of the p-type layer PS of the germanium optical receiver PD is exposed is formed in the first interlayer insulating film ID1 and the second interlayer insulating film ID2, and then a non-doped germanium layer GE is selectively formed on the upper surface of the p-type layer PS exposed on a bottom of the opening. Then, an n-type layer NS is selectively formed on the upper surface of the germanium layer GE.

Then, a third interlayer insulating film ID3, a wiring M1 of a first layer, a fourth interlayer insulating film ID4, a wiring M2 of a second layer, a protection film TC, and the like are sequentially formed in a manner almost same as that in the first embodiment. This substantially completes a semiconductor device according to the third embodiment described above.

The third embodiment has illustrated an example in which the third optical signal line OT3 is formed above the second optical signal line OT2 with the first interlayer insulating film ID1 interposed therebetween, but is not limited to this structure. For example, as illustrated in FIG. 22, the third optical signal line OT3 may be formed in a region where the first optical signal line OT1 and the second optical signal line OT2 are not formed with the first interlayer insulating film ID1 interposed therebetween. A cross-section of the third optical signal line OT3 that is orthogonal to an optical waveguide direction may have a quadrangular shape or a protruding shape.

In the third embodiment, the first optical signal line OT1 and the second optical signal line OT2 are formed by the first semiconductor layer SL1 made of a polycrystalline silicon film, and the third optical signal line OT3 is formed by the second semiconductor layer SL2 made of a polycrystalline silicon film. However, the embodiment is not limited to this structure. For example, as illustrated in FIG. 23, the first optical signal line OT1, the second optical signal line OT2, the grating coupler GC, the optical modulator PC, and the p-type layer PS of the germanium optical receiver PD may be formed by a first semiconductor layer SL1 made of a monocrystalline silicon, and the third optical signal line OT3 may be formed by a second semiconductor layer SL2 made of a polycrystalline silicon film.

In the third embodiment, an optical waveguide having a two-layer structure is formed. However, the embodiment is not limited to this structure. An optical waveguide having three or more layers may be formed.

As described above, according to the third embodiment, since a semiconductor layer made of a polycrystalline silicon film can be formed, for example, by an LPCVD method, an optical waveguide can have a multilayer structure. This can have a higher flexibility in layout of an optical waveguide in the optical waveguide made of a polycrystalline silicon film, thereby making it possible to manufacture a semiconductor device having a higher integration, in addition to the effect of achieving good optical properties.

As described above, the invention by the inventors has been specifically explained according to the embodiments, however, it is obvious that the invention is not limited to the embodiments and various changes may be made without departing from the scope of the invention.

The present invention includes at least the following embodiments.

[Additional Note 1]

A method for manufacturing a semiconductor device, comprising the steps of:

(a) preparing a substrate in which a first insulating film is formed on a main surface of a semiconductor substrate;

(b) forming a polycrystalline silicon film on an upper surface of the first insulating film;

(c) performing thermal treatment at a temperature higher than a growth temperature of the polycrystalline silicon film;

(d) planarizing an upper surface of the polycrystalline silicon film; and (e) forming an optical waveguide by forming a resist mask on the upper surface of the polycrystalline silicon film, and then by processing the polycrystalline silicon film with use of the resist mask as an etching mask, wherein:

in the step (d), crystal grains of polycrystalline silicon exposed on the upper surface of the polycrystalline silicon film are processed so as to have flat surfaces parallel to the main surface of the semiconductor substrate, and in the step (e), crystal grains of polycrystalline silicon exposed on side surfaces of the polycrystalline silicon film are processed so as to have flat surfaces perpendicular to the main surface of the semiconductor substrate.

[Additional Note 2]

The method for manufacturing a semiconductor device according to additional note 1, wherein the polycrystalline silicon film is formed by a chemical vapor deposition method.

[Additional Note 3]

The method for manufacturing a semiconductor device according to additional note 1, wherein the step (b) includes the steps of:

(b1) forming an amorphous silicon film on the upper surface of the first insulating film by a chemical vapor deposition method; and (b2) forming the polycrystalline silicon film by crystallizing the amorphous silicon film through thermal treatment.

What is claimed is:

1. A semiconductor device comprising:
a semiconductor substrate;
a first insulating film formed over a main surface of the semiconductor substrate;
an optical waveguide formed on the first insulating film; and
a second insulating film formed on the first insulating film such that the second insulating film covers the optical waveguide,
wherein the optical waveguide is made of polycrystalline silicon,
crystal grains of the polycrystalline silicon exposed on an upper surface of the optical waveguide include crystal grains having surfaces extending along the main surface of the semiconductor substrate,
crystal grains of the polycrystalline silicon exposed on side surfaces of the optical waveguide include crystal grains having surfaces extending along a direction perpendicular to the main surface of the semiconductor substrate, and
the second insulating film contacts the upper surface and the side surfaces of the optical waveguide and contacts an upper surface of the first insulating film.

2. The semiconductor device according to claim 1, wherein a crystal grain diameter of each crystal grain of the polycrystalline silicon is 50 nm to 150 nm.

3. The semiconductor device according to claim 2, wherein a thickness of the optical waveguide is 100 nm to 400 nm.

4. The semiconductor device according to claim 1,
wherein the optical waveguide extends in a direction parallel to the main surface of the semiconductor substrate, and
the first insulating film, the optical waveguide, and the second insulating film are constructed so as to guide light traveling in the optical waveguide along the direction parallel to the main surface of the semiconductor substrate.

5. The semiconductor device according to claim 1,
wherein, in cross-sectional view, the optical waveguide has a rib shape, with a protruding portion between a pair of slab portions, and
a thickness of the protruding portion along the direction perpendicular to the main surface of the semiconductor substrate is greater than that of the slab portions.

6. The semiconductor device according to claim 1, further comprising a plurality of interlayer insulating films formed over the second insulating film.

7. The semiconductor device according to claim 1, wherein the optical waveguide extends along a traveling direction of light traveling in the optical waveguide.

8. The semiconductor device according to claim 1, wherein the upper surface of the optical waveguide is a surface polished by a chemical-mechanical polishing (CMP) method.

9. A semiconductor device comprising:
a semiconductor substrate;
a first insulating film formed over a main surface of the semiconductor substrate;
a first optical waveguide formed on the first insulating film;
a second insulating film formed on the first insulating film such that the second insulating film covers the first optical waveguide;
a second optical waveguide formed on the second insulating film; and
a third insulating film formed on the second insulating film such that the third insulating film covers the second optical waveguide,
wherein the second optical waveguide is made of first polycrystalline silicon,
crystal grains of the first polycrystalline silicon exposed on an upper surface of the second optical waveguide include crystal grains having surfaces extending along the main surface of the semiconductor substrate,
crystal grains of the first polycrystalline silicon exposed on side surfaces of the second optical waveguide include crystal grains having surfaces extending along a direction perpendicular to the main surface of the semiconductor substrate, and
the third insulating film contacts the upper surface and the side surfaces of the second optical waveguide and contacts an upper surface of the second insulating film.

10. The semiconductor device according to claim 9, wherein the first optical waveguide is made of monocrystalline silicon.

11. The semiconductor device according to claim 9,
wherein the first optical waveguide is made of second polycrystalline silicon,
crystal grains of the second polycrystalline silicon exposed on an upper surface of the first optical waveguide include crystal grains having surfaces extending along the main surface of the semiconductor substrate, and
crystal grains of the second polycrystalline silicon exposed on side surfaces of the first optical waveguide include crystal grains having surfaces extending along the direction perpendicular to the main surface of the semiconductor substrate.

12. The semiconductor device according to claim 11, wherein a crystal grain diameter of each crystal grain of the first polycrystalline silicon is different from a crystal grain diameter of each crystal grain of the second polycrystalline silicon.

13. The semiconductor device according to claim 11, wherein a crystal grain diameter of each crystal grain of the second polycrystalline silicon is 50 nm to 150 nm.

14. The semiconductor device according to claim 9, wherein a crystal grain diameter of each crystal grain of the first polycrystalline silicon is 50 nm to 150 nm.

15. The semiconductor device according to claim 13, wherein a thickness of the first optical waveguide is 100 nm to 400 nm.

16. The semiconductor device according to claim 14, wherein a thickness of the second optical waveguide is 100 nm to 400 nm.

17. The semiconductor device according to claim 9, wherein the first optical waveguide extends along a traveling direction of light traveling in the first optical waveguide, and the second optical waveguide extends along a traveling direction of light traveling in the second optical waveguide.

18. The semiconductor device according to claim 9, wherein the upper surface of the second optical waveguide is a surface polished by a chemical-mechanical polishing (CMP) method.

19. The semiconductor device according to claim 11, wherein the second insulating film contacts the upper surface and the side surfaces of the first optical waveguide and contacts an upper surface of the first insulating film.

* * * * *